US012748211B2

(12) United States Patent
Wheatley et al.

(10) Patent No.: US 12,748,211 B2
(45) Date of Patent: Sep. 29, 2026

(54) OPTICAL SENSING SYSTEMS

(71) Applicant: 3M INNOVATIVE PROPERTIES COMPANY, St. Paul, MN (US)

(72) Inventors: John A. Wheatley, Stillwater, MN (US); Raghunath Padiyath, Woodbury, MN (US); Gilles J. Benoit, Minneapolis, MN (US); Michael D. Holden, River Falls, WI (US); Martin J. Sisolak, St. Paul, MN (US); Travis L. Potts, Woodbury, MN (US); Jincy Jose, Eagan, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 413 days.

(21) Appl. No.: 18/558,419

(22) PCT Filed: May 5, 2022

(86) PCT No.: PCT/IB2022/054178
§ 371 (c)(1),
(2) Date: Nov. 1, 2023

(87) PCT Pub. No.: WO2022/238827
PCT Pub. Date: Nov. 17, 2022

(65) Prior Publication Data

US 2024/0230912 A1 Jul. 11, 2024

Related U.S. Application Data

(60) Provisional application No. 63/201,696, filed on May 10, 2021.

(51) Int. Cl.
*G01S 17/931* (2020.01)
*B60J 1/20* (2006.01)
(Continued)

(52) U.S. Cl.
CPC ............... *G01S 17/931* (2020.01); *B60J 1/20* (2013.01); *G01S 7/4813* (2013.01); *G02B 1/04* (2013.01); *G02B 5/208* (2013.01)

(58) Field of Classification Search
None
See application file for complete search history.

(56) References Cited

U.S. PATENT DOCUMENTS

2002/0075580 A1 6/2002 Kubota
2005/0122587 A1 6/2005 Ouderkirk et al.
(Continued)

FOREIGN PATENT DOCUMENTS

WO 2020025360 A1 2/2020
WO 2021036387 A1 3/2021

OTHER PUBLICATIONS

International Search report for PCT International Application No. PCT/IB2022/054178, mailed on Aug. 18, 2022, 3 pages.
(Continued)

*Primary Examiner* — Michael H Caley
(74) *Attorney, Agent, or Firm* — Christopher P. Tebow

(57) ABSTRACT

An optical sensing system includes an optical film and a transceiver configured to at least one of emit and receive a first light toward an object through the optical film along a propagation direction making a first angle of greater than about 20 degrees in an air with a normal to the optical film. The first light has a first infrared wavelength in an infrared wavelength range extending from about 800 nm to about 2000 nm. For an incident light incident on the optical film in the air and having the first infrared wavelength and for at least one of mutually orthogonal first and second polarization states, the optical film reflects at least 60% of the incident light at an incident angle of less than about 5
(Continued)

degrees, and transmits at least 40% of the incident light at an incident angle substantially equal to the first angle.

10 Claims, 20 Drawing Sheets

(51) Int. Cl.

| | |
|---|---|
| ***G01S 7/481*** | (2006.01) |
| ***G02B 1/04*** | (2006.01) |
| ***G02B 5/20*** | (2006.01) |

(56) References Cited

U.S. PATENT DOCUMENTS

| | | | | |
|---|---|---|---|---|
| 2015/0260888 | A1 | 9/2015 | Yoshihara | |
| 2018/0284268 | A1 | 10/2018 | Mcwhirter | |
| 2019/0137669 | A1 | 5/2019 | Wheatley et al. | |
| 2019/0293486 | A1 | 9/2019 | Wheatley et al. | |
| 2019/0331837 | A1 | 10/2019 | Wheatley et al. | |
| 2020/0116831 | A1 | 4/2020 | Spiessberger et al. | |
| 2020/0142072 | A1 | 5/2020 | Takahashi et al. | |
| 2020/0257915 | A1 | 8/2020 | Shaver et al. | |
| 2020/0386929 | A1* | 12/2020 | Uchida | G02B 5/282 |
| 2022/0373651 | A1* | 11/2022 | Novotny | B32B 17/10119 |

OTHER PUBLICATIONS

Product description of Asahi Glass Wide-eye product for Lidar transparent auto glazing, retrieved from internet on Dec. 27, 2023 (date unknown but believed to be prior to date of filing of the application), 9 Pages.

* cited by examiner

OPTICAL SENSING SYSTEMS

CROSS REFERENCE TO RELATED APPLICATIONS

This application is a national stage filing under 35 U.S.C. 371 of PCT/IB2022/054178, filed May 5, 2022, which claims the benefit of U.S. Provisional Application No. 63/201,696, filed May 10, 2021, the disclosures of which are incorporated by reference in their entireties herein.

TECHNICAL FIELD

The disclosure generally relates to optical sensing systems, specifically to optical films configured to be incorporated in a window and optically transparent to Light Detection and Ranging (LiDAR).

BACKGROUND

Automobiles are increasingly becoming self-driven. Newer vehicles include features such as adaptive cruise control and parking assist systems that allow cars to steer themselves into parking spaces. Attempts are being made to create almost fully autonomous vehicles that can navigate with nearly no direct human input. Information and data on the surrounding of the self-driven vehicles are obtained from vehicle-external sources using sensing systems such as LiDAR and other near-infrared (NIR) sensors. Such sources external to the vehicle may include sensors connected to preceding and oncoming vehicles, pedestrians, cyclists, etc., and also sensors mounted on structures such as traffic lights, bridges, etc. The sensing systems may be configured to be installed outside or inside the vehicle. Sensing systems provided inside a cabin of the vehicle shield the sensors from being exposed to environmental conditions, including inclement weather, etc.

SUMMARY

Some aspects of the disclosure relate to an optical sensing system including an optical film including a plurality of polymeric layers numbering at least 20 in total. Each of the polymeric layers have an average thickness of less than about 500 nm. The optical sensing system includes a transceiver having at least one of a transmitter and a receiver and configured to at least one of emit and receive a first light toward an object through the optical film along a propagation direction making a first angle in an air with a normal to the optical film, the first angle greater than about 20 degrees. The first light has a first infrared wavelength in an infrared wavelength range extending from about 800 nm to about 2000 nm. For an incident light incident on the optical film in the air and having the first infrared wavelength and for at least one of mutually orthogonal first and second polarization states, the plurality of polymeric layers reflects at least 60% of the incident light at an incident angle of less than about 5 degrees, and transmits at least 40% of the incident light at an incident angle substantially equal to the first angle.

Some other aspects of the disclosure relate to an optically transparent window configured to be the window of a vehicle including an optical film disposed between, and bonded to, first and second substrate layers. The optical film includes a plurality of alternating different polymeric first and second layers numbering at least 20 in total. Each of the first and second layers has an average thickness of less than about 500 nm. The first and second layers have respective indices of refraction nx1 and nx2 along a same in-plane first direction, ny1 and ny2 along an in-plane second direction orthogonal to the first direction, and nz1 and nz2 along a third direction orthogonal to the first and second directions. For a first infrared wavelength between about 800 nm and about 2000 nm, $nx1-nx2>0.1$, $ny1-ny2>0.1$, and nz1 and nz2 are within about 20% of each other. For an incident light incident on the optical film in an air and having the first infrared wavelength and for each of mutually orthogonal first and second polarization states, the window reflects at least 60% of the incident light at an incident angle of less than about 5 degrees, and transmits at least 40% of the incident light at an incident angle of greater than about 30 degrees.

Some other aspects of the disclosure relate to a flexible optical construction configured to be incorporated in a window. The flexible optical construction includes an optical film bonded to, and substantially coextensive in length and width with, a first bonding layer configured to bond to a first substrate of the window. The optical film includes a plurality of alternating different polymeric first and second layers numbering at least 20 in total. Each of the first and second layers have an average thickness of less than about 500 nm. The first and second layers have respective indices of refraction nx1 and nx2 along a same in-plane first direction, ny1 and ny2 along an in-plane second direction orthogonal to the first direction, and nz1 and nz2 along a third direction orthogonal to the first and second directions. For a first infrared wavelength between about 800 nm and about 2000 nm, $nx1-nx2>0.1$, and nz1 and nz2 are within about 20% of each other. For an incident light incident in an air and having the first infrared wavelength and for each of mutually orthogonal first and second polarization states, for the first infrared wavelength, the optical film reflects at least 60% of the incident light at a first incident angle of less than about 5 degrees, and transmits at least 40% of the incident light at a second incident angle of greater than about 30 degrees. The first bonding layer has an optical transmittance of greater than about 80% for each of the first and second incident angles. For an incident light incident in an air and having the first infrared wavelength and for each of mutually orthogonal first and second polarization states, for a visible wavelength range between about 420 nm and about 680 nm, each of the optical film and the first bonding layer has an average optical transmittance of greater than about 70% (or 80%). The flexible optical construction is configured to bend at a radius of less than about 10 cm with no or little damage to the flexible optical construction.

Other aspects of the disclosure relate to a vehicle including a window and an optical sensing system of one or more embodiments of the disclosure. The window includes an optical film embedded therein and a transceiver disposed in an interior cabin of the vehicle so that the optical film is disposed between the transceiver and an exterior surface of the window.

BRIEF DESCRIPTION OF DRAWINGS

The various aspects of the disclosure will be discussed in greater detail with reference to the accompanying figures where, FIG. 1 schematically shows an optical sensing system according to some embodiments of the disclosure.

The figures are not necessarily to scale. Like numbers used in the figures refer to like components. However, it will be understood that the use of a number to refer to a component in a given figure is not intended to limit the component in another figure labelled with the same number.

DETAILED DESCRIPTION OF ILLUSTRATIVE EMBODIMENTS

In the following description, reference is made to the accompanying drawings that form a part hereof and in which various embodiments are shown by way of illustration. It is to be understood that other embodiments are contemplated and may be made without departing from the scope or spirit of the present description. The following detailed description, therefore, is not to be taken in a limiting sense.

LiDAR sensing systems located on the outside of vehicles are exposed to inclement weather such as ice formation, condensation, rain droplets, and roadway soiling that can interfere with proper operation. Locating the LiDAR system inside the vehicle cabin, say behind the windshield, may protect it from the outside environment. However, solar control films disposed on the windshield may largely or completely block the near-infrared or infrared wavelengths, usually 850-950 nm or 1400-1700 nm at which the LiDAR sensing systems may function, which may make the LiDAR system non-operational. Embodiments described herein address these and other challenges.

Some embodiments of the present disclosure describe an optical sensing system including a multilayer optical film (MOF) that can be transparent to LiDAR and can provide solar heat load reduction. The angle shifting properties of the MOF may be utilized so that at oblique incidence the MOF infrared blocking band shifts past the LiDAR operational wavelength and enables transmission.

Figure 1:
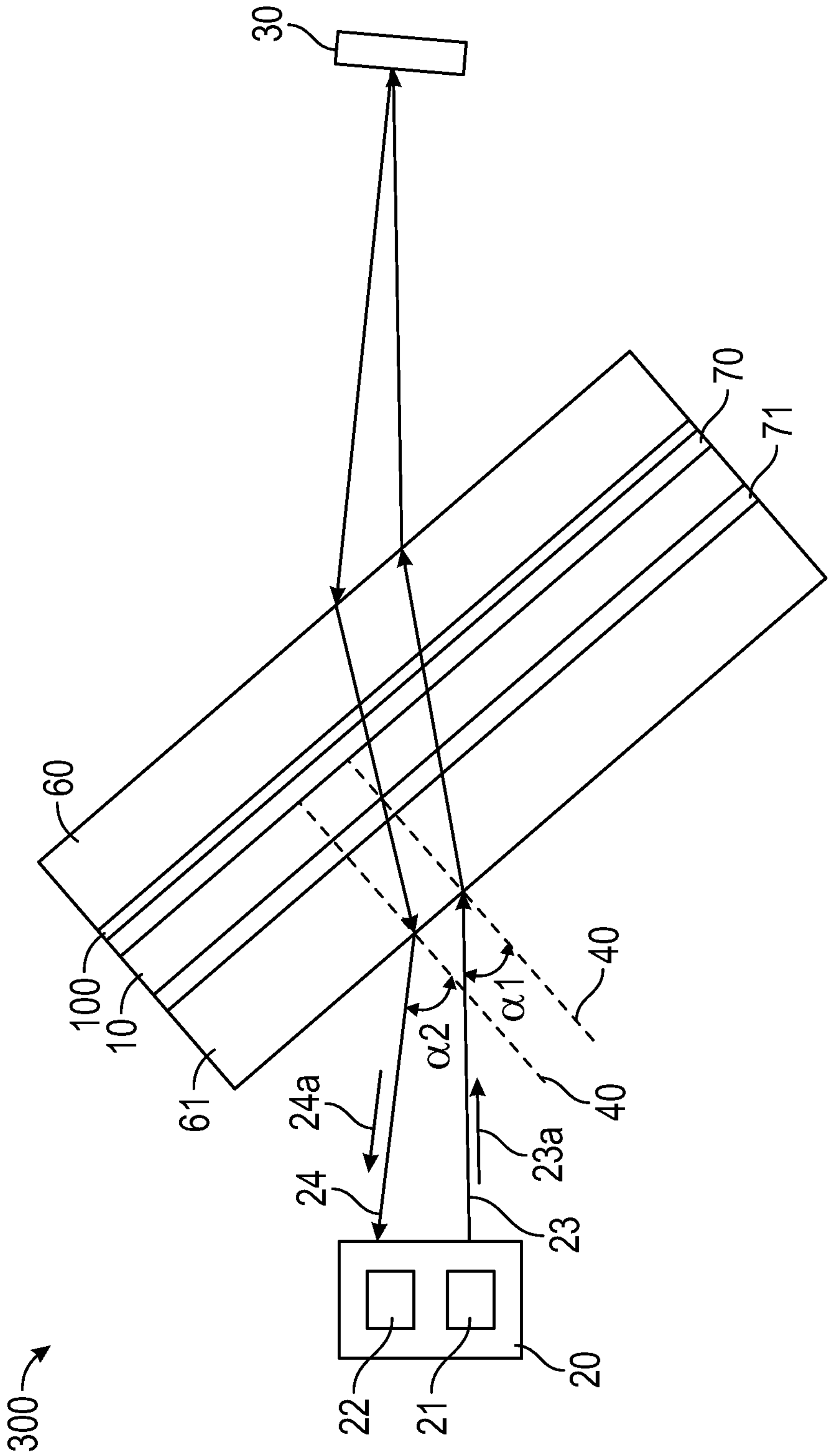

Some embodiments of an optical sensing system (300) are illustrated in FIG. 1. The optical sensing system (300) includes an optical film (10) and a transceiver (20). The transceiver (20) may include at least one of a transmitter (21) and a receiver (22). In some aspects, the transceiver (20) may include at least one transmitter (21) and at least one receiver (22). The transceiver (20) may be an optical transceiver configured to at least one of emit (23) and receive (24) a first light toward an object (30) through the optical film (10) along a propagation direction (23*a*. 24*a*). In some aspects, the transmitter (21) may include a laser light source and the receiver (22) may include an optical detector. In some cases, the receiver (22) may include a camera. The transceiver (20), in some embodiments, may be a LiDAR transceiver.

Figure 8:
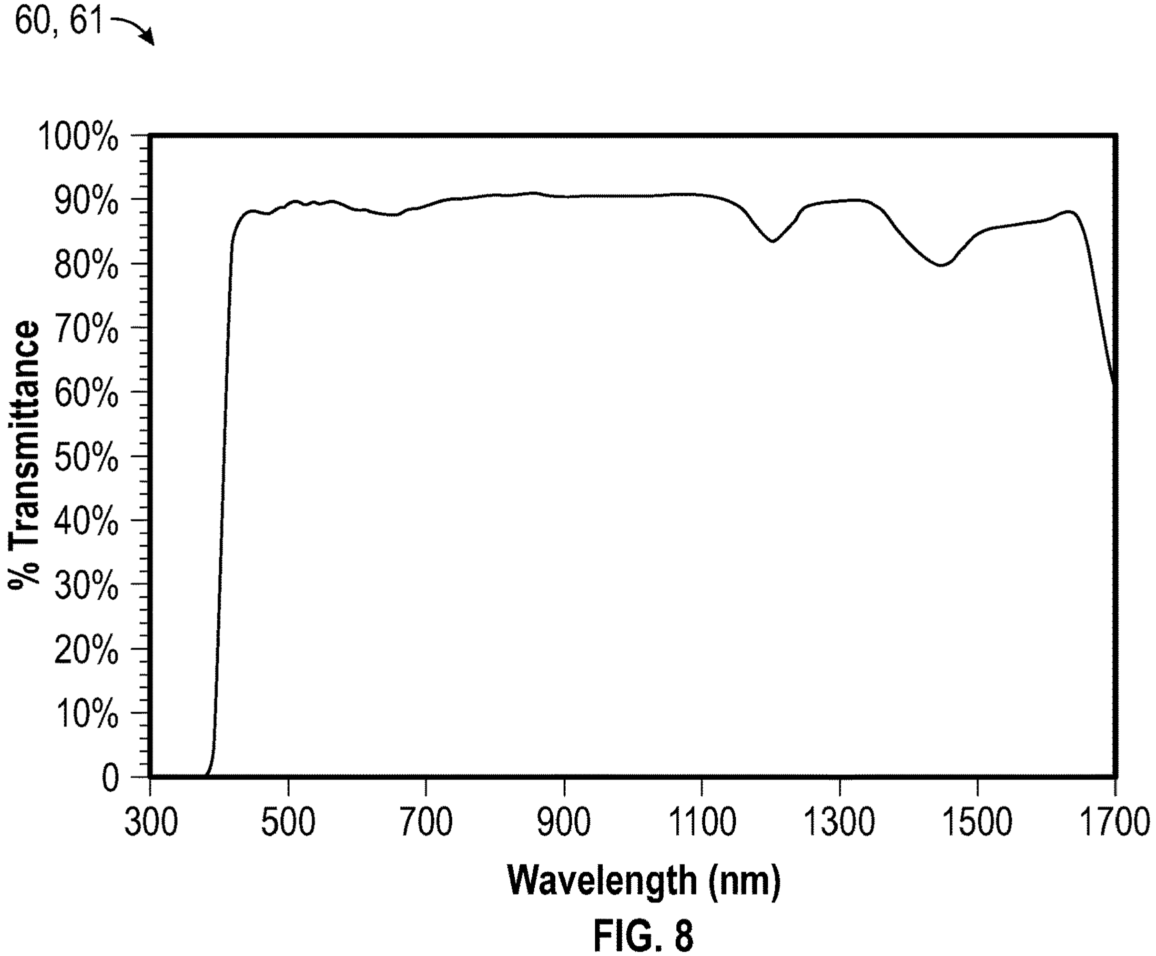
FIG. 8 graphically shows the transmission spectra of first and second substrate layers of a window according to some embodiments.

In some aspects, the optical sensing system (300) may further include a first substrate layer (60) and a second substrate layer (61). As shown in FIG. 8, each of the first (60) and second (61) substrate layers may have an average optical transmittance of greater than about 50%, or greater than about 60%, or greater than about 70%, or greater than about 80%, or greater than about 85%, or greater than about 90% in a wavelength range extending from about 700 nm to about 1600 nm. In some embodiments, at least one of the first (60) and second (61) substrate layers may include glass. In other cases, each of the first (60) and second (61) substrate layers may include glass. In some aspects, the optical sensing system (300) may include an electrically conductive optically transparent electrode (100). As shown in the illustrated embodiment, the electrically conductive optically transparent electrode (100) may be disposed between the optical film (10) and the first substrate layer (60). The optically transparent electrode (100) may have an optical transmittance of greater than about 70%, or greater than about 80%, or greater than about 90% for at least one visible wavelength between about 420 nm and about 680 nm.

In some aspects, the optical film may be disposed between, and bonded to, the first and second substrate layers (60, 61). For instance, the optical film (10) may be bonded to the first (60) and second (61) substrate layers via respective first (70) and second (71) bonding layers. At least one of the first and second bonding layers (70, 71) may include one or more of a polyvinyl butyral (PVB), a pressure sensitive adhesive (PSA), an ethylene vinyl acetate (EVA), a polyolefin, or a polyurethane, or the like.

In some aspects, at least a region of each of the first and second bonding layers (70, 71) may have an average optical transmittance of greater than about 50%, or greater than about 60%, or greater than about 70%, or greater than about 80%, or greater than about 85%, or greater than about 90% in a wavelength range extending from about 700 nm to about 1600 nm. In other aspects, for a visible wavelength range between about 420 nm and about 680 nm, each of the optical film (10) and the first bonding layer (70) may have an average optical transmittance of greater than about 70%, or greater than about 80%.

In some aspects, the transceiver (20) may be configured to emit (23) the first light along the propagation direction (23*a*) and make a first angle ($\alpha$1) in an air with a normal (40) to the optical film (10). The transceiver (20) may be further configured to receive (24) the first light along the propagation direction (24*a*) and make a second angle ($\alpha$2) in an air with a normal (40) to the optical film (10). In some embodiments, the first angle ($\alpha$1, $\alpha$2) may be greater than about 20 degrees. For instance, the first angle ($\alpha$1, $\alpha$2) may be about 25 degrees, or about 30 degrees, or about 35 degrees, or about 40 degrees, or about 45 degrees, or about 50 degrees, or about 55 degrees, or about 60 degrees, or about 65 degrees.

Figure 3:
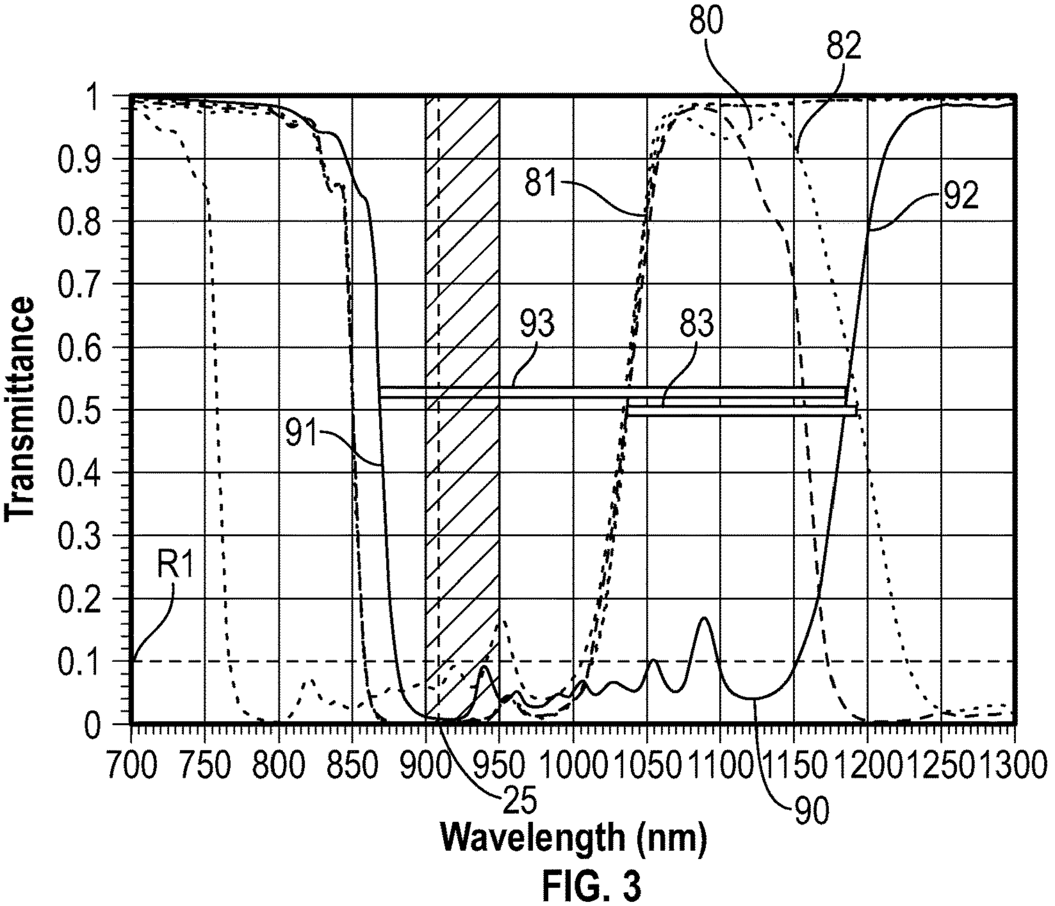
FIGS. 3-5 graphically show the transmission spectra of the optical film at different incident angles of light incident on the optical film.
Figure 4:
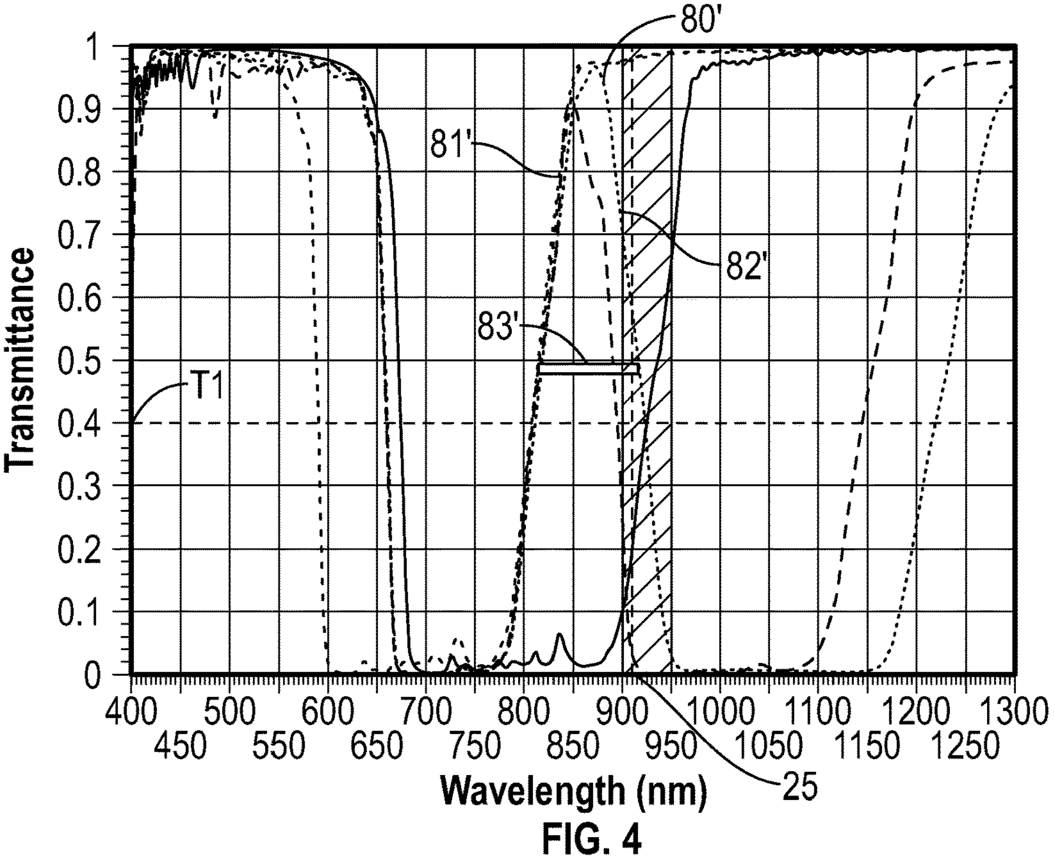
Figure 5:
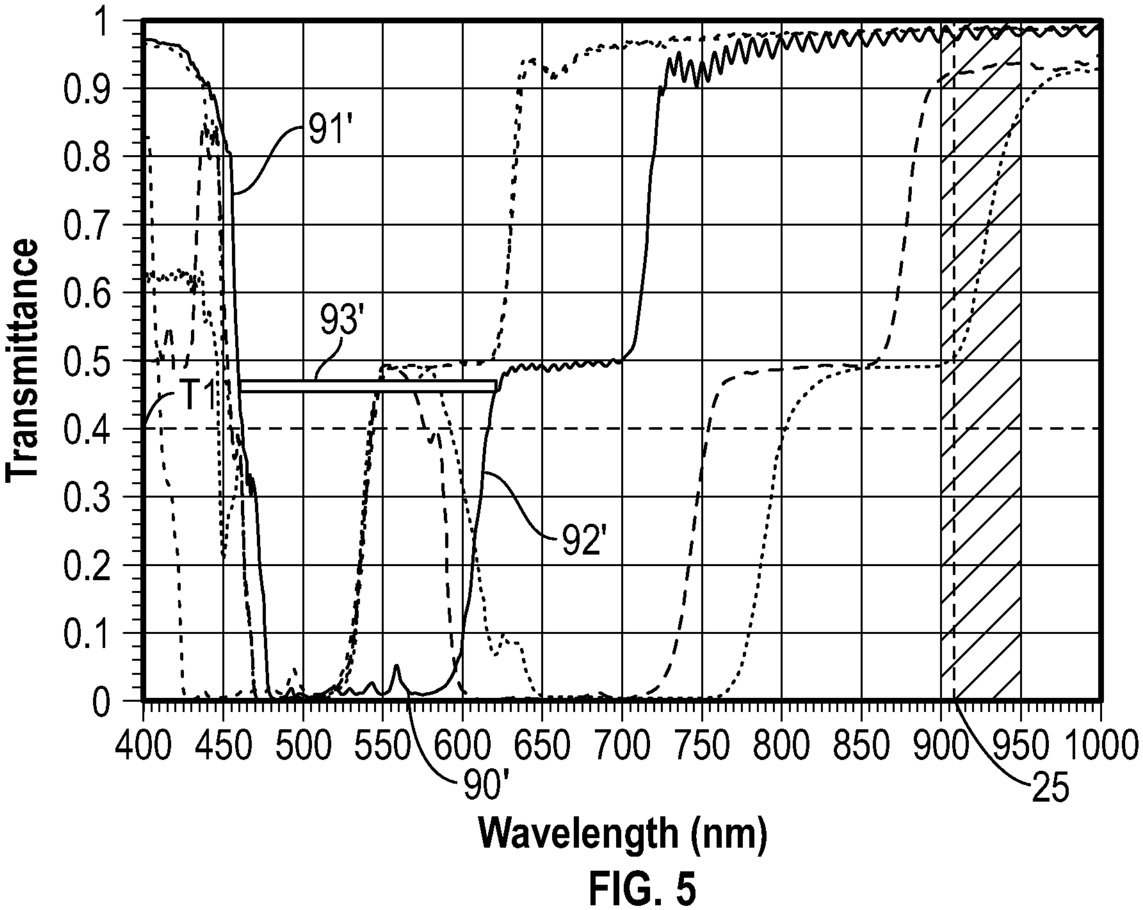

As shown in FIGS. 3-5, the first light may have a first infrared wavelength (25) in an infrared wavelength range extending from about 800 nm to about 2000 nm. In some instances, the first infrared wavelength (25) may be between about 850 nm to about 950 nm, or between about 900 nm to about 950 nm. In other instances, the first infrared wavelength (25) may be between about 1400 nm to about 1700 nm, or between about 1500 nm to about 1600 nm. The first light, in some cases, may include a pulsed laser light. In other cases, the first light may include a continuous laser light. The continuous laser light, some instances, may be at least one of phase and frequency modulated.

Figure 2:
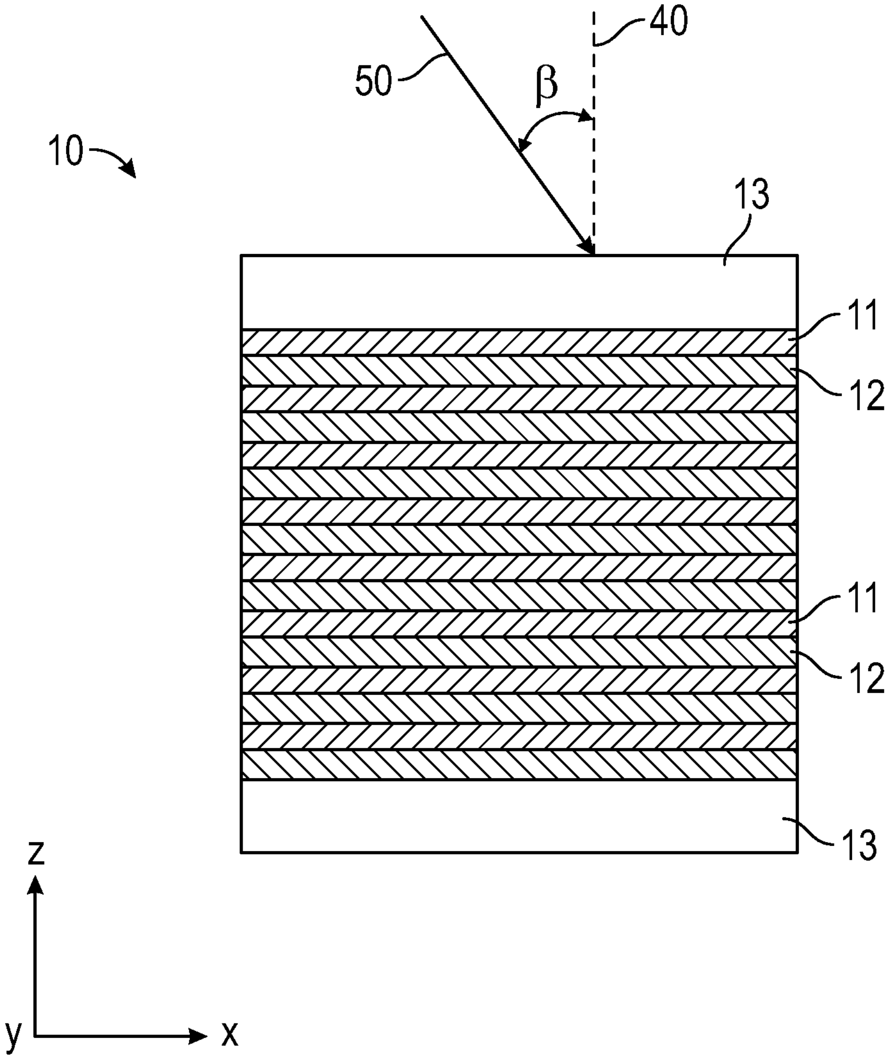
FIG. 2 schematically shows the construction of an optical film of an optical sensing system according to some embodiments.

The optical film (10) in some embodiments may be a multilayer optical film (MOF) including a plurality of layers (11, 12), as shown in FIG. 2. In some aspects, the optical film may include a plurality of polymeric layers (11, 12). In some embodiments, the plurality of polymeric layers may include a plurality of alternating polymeric different first (11) and second (12) layers. For instance, the optical film (10) may include alternating first (11) and second (12) polymeric layers including at least one birefringent polymer (e.g, oriented semi-crystalline polymer) and one second polymer.

In other embodiments, the materials of first and second layers (11, 12) may be composed of polymers such as polyesters. For instance, an exemplary polymer useful as a first birefringent layer (11) may be polyethylene naphthalate (PEN). Other semicrystalline polyesters suitable as birefringent polymers as the first birefringent layer (11) in the multilayer polymeric film may include, for example, polybutylene 2,6-naphthalate (PBN), polyethylene terephthalate (PET), or the like. The second layer (12) can be made from a variety of polymers having glass transition temperatures compatible with that of the first birefringent polymer layer (11) and having a refractive index similar to the isotropic refractive index of the first birefringent polymer layer (11). Examples of other polymers suitable for use in optical films and, particularly, in the second polymer layer (12) may include vinyl polymers and copolymers made from monomers such as vinyl naphthalenes, styrene, maleic anhydride, acrylates, and methacrylates. Examples of such polymers for the second polymer layer (12) include polyacrylates, polymethacrylates, such as poly methyl methacrylate (PMMA), and isotactic or syndiotactic polystyrene. Other polymers include condensation polymers such as polysulfones, polyamides, polyurethanes, polyamic acids, and polyimides. In addition, the second polymer layer (12) can be formed from homopolymers and copolymers of polyesters, polycarbonates, fluoropolymers, and polydimethylsiloxanes, and blends thereof. The layers can be selected to achieve the reflection of a specific bandwidth of electromagnetic radiation.

In one embodiment, the materials of the plurality of layers (11, 12) may have differing indices of refraction. In some embodiments, the optical film (10) may include PET as the first optical layer (11) and co polymers of PMMA (coPMMA), or any other polymer having low refractive index, including copolyesters, fluorinated polymers or combinations thereof as the second optical layer (12). The transmission and reflection characteristics of the optical film (10) may be based on coherent interference of light caused by the refractive index difference between the layers (11, 12) and the thicknesses of layers (11, 12). According to some embodiments, the first and second layers (11, 12) may have respective indices of refraction nx1 and nx2 along a same in-plane first direction, ny1 and ny2 along an in-plane second direction orthogonal to the first direction, and nz1 and nz2 along a third direction orthogonal to the first and second directions. In some cases, for at least the first infrared wavelength (25), nx1−nx2>0.1, and nz1 and nz2 may be within 20% of each other. In some embodiments, ny1−ny2>0.1. In some other cases, nx1−nx2>0.15, or nx1−nx2>0.2. In some instances, ny1−ny2>0.15, or ny1−ny2>0.2.

In some instances, the plurality of polymeric layers (11, 12) may number at least 10, or 20 in total. In some cases, the plurality of polymeric layers (11, 12) may number at least 50, or at least 100, or at least 200, or at least 300, or at least 400, or at least 500 in total. Each of the polymeric layers (11, 12) may have an average thickness of less than about 500 nm, or less than about 400 nm, or less than about 300 nm, or less than about 200 nm, or less than about 150 nm. In some embodiments, the number of layers in the optical film (10) may be selected to achieve the desired optical properties using the minimum number of layers for reasons of film thickness, flexibility and economy.

In other aspects, the optical film may further include at least one skin layer (13) disposed on the plurality of polymeric layers (11, 12). The skin layer (13) may have an average thickness of greater than about 500 nm. In some cases, the skin layer (13) may have an average thickness of greater than about 750 nm, or greater than about 1000 nm, or greater than about 1250 nm, or greater than about 1500 nm. In some embodiments, the optical film (10) may be physically continuous.

In some aspects, since the MOF shifts to shorter wavelengths with increased angle of incidence, the reflecting band of the MOF may be designed to shift past the LiDAR transmission wavelength at oblique angles of incidence and allows for transmission of the LiDAR wavelength. FIGS. 3-5 show the transmission spectra of MOF at different incident angles of light incident on the MOF. The transmission spectra of three different MOF designs are shown using different lines in FIGS. 3-5.

According to some embodiments, an incident light (50) may be incident on the optical film (10) in the air at an incident angle (Β). In some aspects, for incident light (50) incident on the optical film (10) at an angle (Β) of less than about 5 degrees and having the first infrared wavelength (25) and for at least one of, or each of, mutually orthogonal first (x-axis) and second (y-axis) polarization states, the plurality of polymeric layers (11, 12) may reflect (R1) at least 60%, or at least 70%, or at least 80%, or at least 90% of the incident light (50) as shown in FIG. 3. In some aspects, for incident light (50) incident at an angle (Β) substantially equal to the first angle ($\alpha$1, $\alpha$2) and having the first infrared wavelength (25) and for at least one of, or each of, mutually orthogonal first (x-axis) and second (y-axis) polarization states, the plurality of polymeric layers (11, 12) may transmit (T1) at least 40%, or at least 50%, or at least 60%, or at least 70%, or at least 80% of the incident light (50) as shown in FIGS. 4-5.

With reference to FIGS. 3-5, in some embodiments, for the incident light (50) incident on the optical film (10) in the air, the plurality of the polymeric layers (11, 12) may include a transmission pass band (80, 80'). The transmission pass band (80, 80') may include a left band edge (LBE) (81, 81') at a short wavelength side of the transmission pass band and a right band edge (RBE) (82, 82') at a long wavelength side of the transmission pass band. In the left band edge (LBE) (81, 81') at a short wavelength side of the transmission pass band (80, 80') the transmission of the optical film (10) generally increases with increasing wavelength. In the right band edge (RBE) (82, 82) at a long wavelength side of the transmission pass band (80, 80') the transmission of the optical film (10) generally decreases with increasing wavelength.

The transmission pass band (80, 80') may include a full width at half maximum (FWHM) (83, 83'). As shown in FIG. 3, when incident light (50) is incident on the optical film (10) at an angle ($\beta$) less than about 5 degrees, the first infrared wavelength (25) is outside the FWHM (83). As shown in FIG. 4, when incident light (50) is incident on the optical film (10) at an angle (Β) substantially equal to the first angle ($\alpha$1, $\alpha$2) the first infrared wavelength (25) is within the FWHM (83).

In some other embodiments, for the incident light (50) incident on the optical film (10) in the air, the plurality of the polymeric layers (11, 12) may include a transmission stop band (90, 90'). The transmission stop band (90, 90') may include a left band edge (LBE) (91, 91') at a short wavelength side of the transmission stop band (90, 90') and a right band edge (RBE) (92, 92) at a long wavelength side of the transmission stop band (90, 90'). In the left band edge (LBE) (91, 91') at a short wavelength side of the transmission stop band (90, 90') the transmission of the optical film (10) generally decreases with increasing wavelength. In the right band edge (RBE) (92, 92) at a long wavelength side of the transmission stop band (90, 90') the transmission of the optical film (10) generally increases with increasing wavelength.

The transmission stop band (90, 90') may include a full width at half maximum (FWHM) (93, 93"). As shown in FIG. 3, when the incident light (50) is incident on the optical film (10) at an angle (B) less than about 5 degrees, the first infrared wavelength (25) is within the FWHM (93). As shown in FIG. 5, when the incident light (50) is incident on the optical film (10) at an angle (B) substantially equal to the first angle (α1, α2) the first infrared wavelength (25) is outside the FWHM (93').

Figure 6:
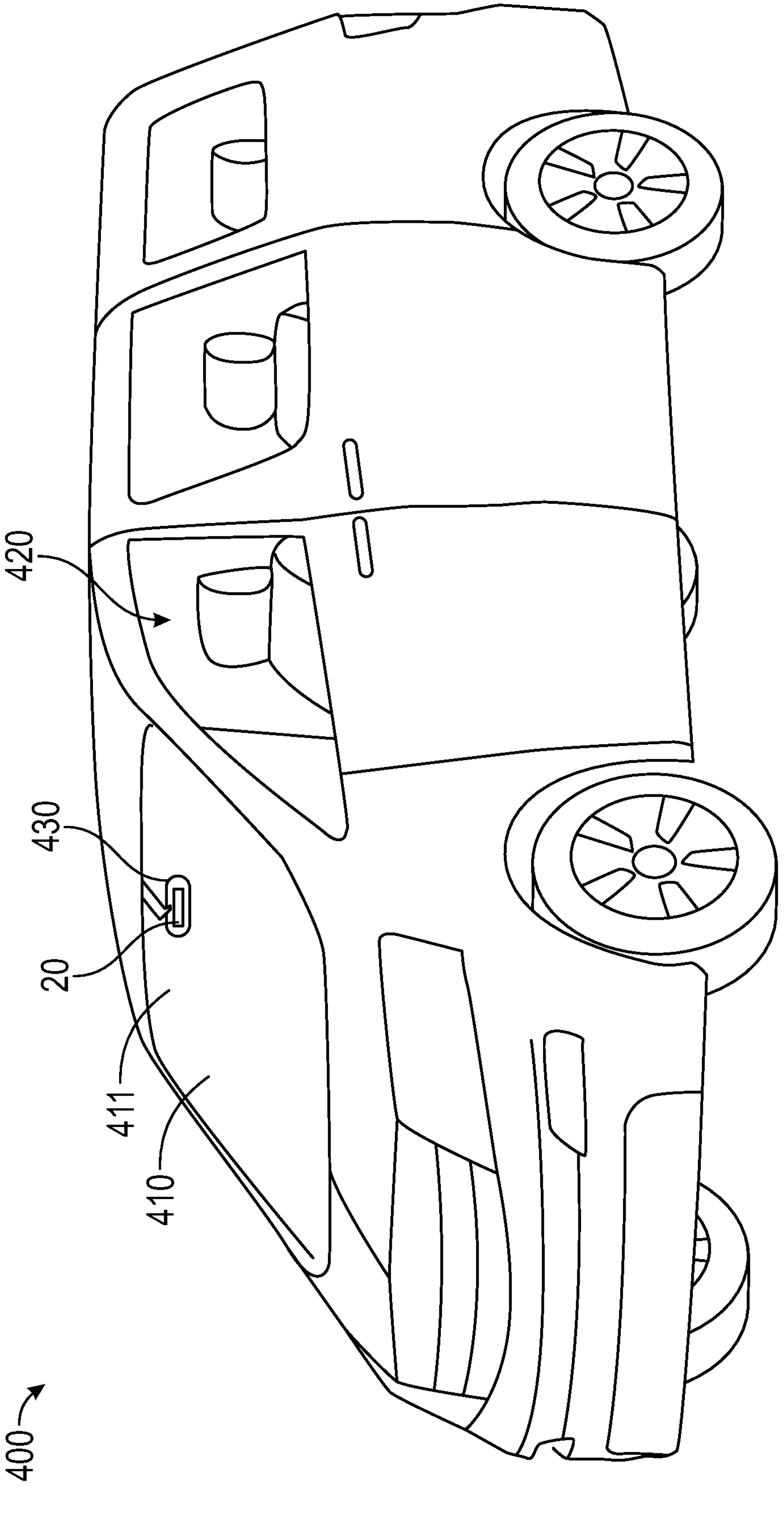
FIG. 6 schematically shows a vehicle having an optical sensing system according to one or more embodiments.

The optical sensing system according to one more embodiments of this disclosure may be provided in a vehicle. As shown in FIG. 6, the vehicle (400) may include a window (410) configured to be an optically transparent window. For instance, the window (410) may be a front windshield of the vehicle (400). A flexible optical construction (411) including the optical film (10) may be configured to be incorporated in the window (410). In some embodiments, the optical film (10) may be embedded in the window. In other embodiments, the optical film (10) may be bonded to a first bonding layer (70) configured to bond to a first substrate (60) of the window (410). The first substrate (60), for instance, may include glass. The optical film (10) may be substantially coextensive in length and width with the first bonding layer (70). In other aspects, the optical film (10) may be further bonded to a second bonding layer (71), opposite the first bonding layer (70). The second bonding layer (71) may be configured to bond to a second substrate (61) of the window. The second substrate (61), for instance, may include glass. The optical film (10) may be substantially coextensive in length and width with the second bonding layer (70). In some embodiments, the flexible optical construction (411) may be configured to bend at a radius of less than about 10 cm, or 9 cm, or 8 cm, or 6 cm, or 5 cm with no or little damage to the flexible optical construction (411).

The flexible optical construction (411) may be configured such that, for an incident light (50) incident in an air and having the first infrared wavelength (25) and for each of mutually orthogonal first (x-axis) and second (y-axis) polarization states, for the first infrared wavelength (25), the optical film (10) may reflect (R1) at least 60%, or at least 70%, or at least 80%, or at least 90% of the incident light (50) at a first incident angle (β) of less than about 5 degrees. The flexible optical construction (411) may be further configured such that, for an incident light (50) incident in an air and having the first infrared wavelength (25) and for each of mutually orthogonal first (x-axis) and second (y-axis) polarization states, for the first infrared wavelength (25), the optical film (10) may transmit (T1) at least 40%, or at least 50%, or at least 60%, or at least 70%, or at least 80% of the incident light (50) at a second incident angle (β). The second incident angle, in some embodiments, may be greater than about 30 degrees or greater than about 40, or greater than about 50, or greater than about 55 degrees.

In some aspects, the flexible optical construction (411) may be configured such that the first bonding layer (70) may have an optical transmittance of greater than about 80% for each of the first and second incident angles. In other aspects, for a visible wavelength range between about 420 nm and about 680 nm, each of the optical film (10) and the first bonding layer (70) may have an average optical transmittance of greater than about 70%, or greater than about 80%.

The transceiver (20) may be disposed in an interior cabin (420) of the vehicle (400) so that the optical film (10) can be disposed between the transceiver (20) and an exterior surface of the window (410). According to the illustrated embodiment, the transceiver (20) may be disposed on or proximate an interior rear-view mirror (430) of the vehicle. For example, the transceiver (20) may be a LiDAR transceiver disposed behind the rear view mirror (430).

Figure 7:
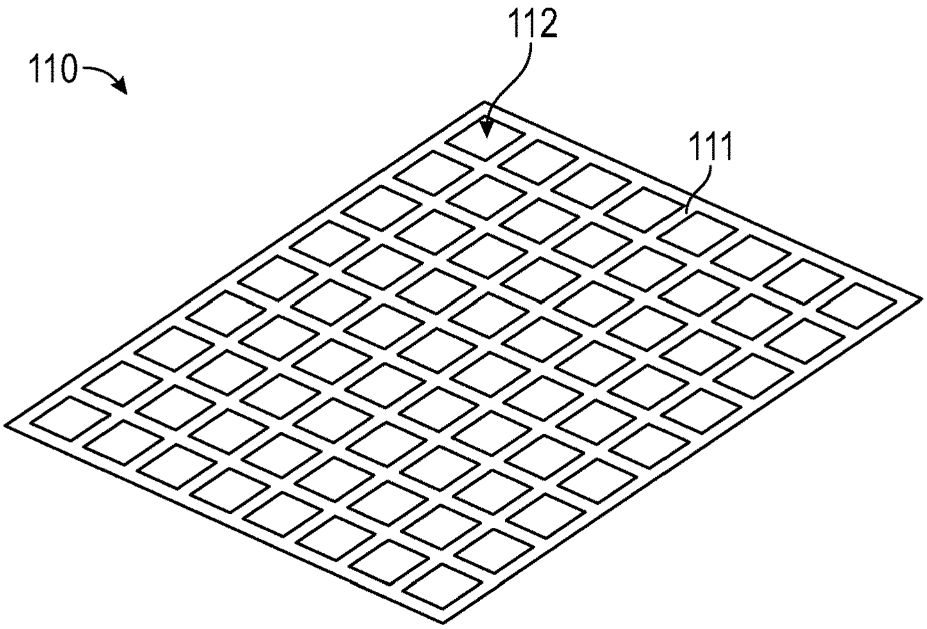
FIG. 7 schematically shows an electrically conductive optically transparent electrode configured to be disposed on a vehicle window.

In some embodiments, the window (410) may further include an electrically conductive optically transparent electrode (100), as shown in FIG. 1, disposed thereon or therein for heating the window (+10). The optically transparent electrode (100) may have an optical transmittance of greater than about 70%, or greater than about 80%, or greater than about 90% for at least one visible wavelength between about 420 nm and about 680 nm. As shown in FIG. 7, the electrically conductive optically transparent electrode may include a metal mesh (110) having a plurality of electrically conductive traces (111) intersecting each other to form a plurality enclosed open areas (112). In some aspects, the window may further include an optical filter for blocking at least a portion of an incident light having a wavelength (25) in the infrared wavelength range extending from about 800 nm to about 2000 nm.

The optical film (10) may be designed to shift to shorter wavelengths with increased angle of incidence (B). In some embodiments, the optical film may be designed such that the reflecting band shifts past the LiDAR transmission wavelength, at least between 900-950 nm, at an oblique angle of incidence. Since vehicle windshields usually have high rake angles (angle between the inclined windshield and the vertical) the incident light (50) may be made incident on the optical film (10) embedded in the windshield (410) at an incident angle (β) of up to, say, 60 degrees.

For instance, according to some embodiments, for incident light (50) incident on the optical film (10) in an air at an angle (β) of less than about 5 degrees and having the first infrared wavelength (25) and for each of mutually orthogonal first (x-axis) and second (y-axis) polarization states, the window (410) may reflect (R1) at least 60%, or at least 70%, or at least 80%, or at least 90% of the incident light (50) as shown in FIG. 3. In some aspects, for incident light (50) incident at an angle (β) greater than about 30 degrees, or about 40 degrees, or about 50 degrees, or about 55 degrees, or about 60 degrees and having the first infrared wavelength (25) and for each of mutually orthogonal first (x-axis) and second (y-axis) polarization states, the window (410) may transmit (T1) at least 40%, or at least 50%, or at least 60%, or at least 70%, or at least 80% of the incident light (50) as shown in FIGS. 4-5.

Figure 9:
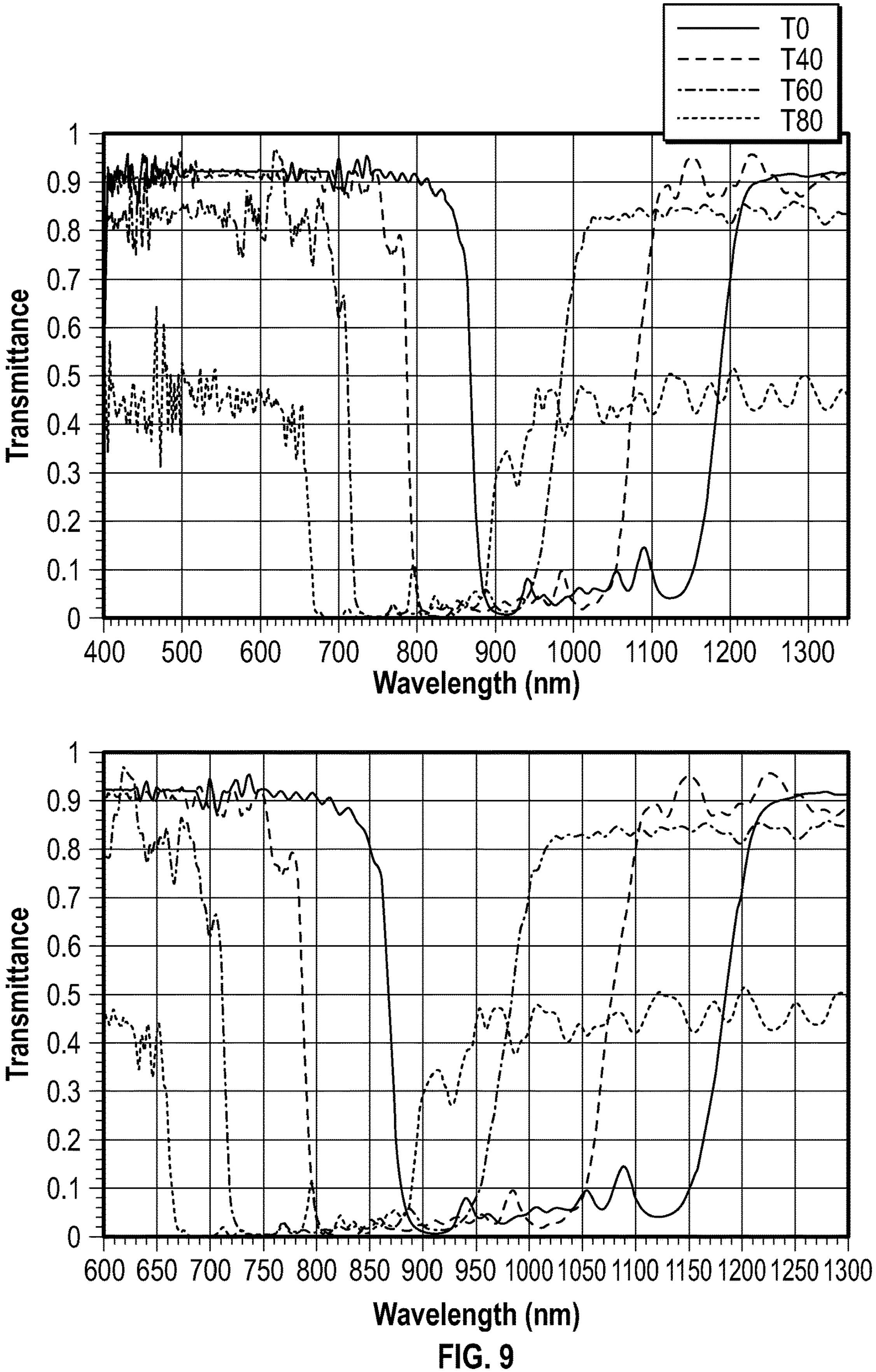
FIGS. 9-22 graphically show the transmission spectra of different designs of optical films at different angles of incident light.
Figure 10:
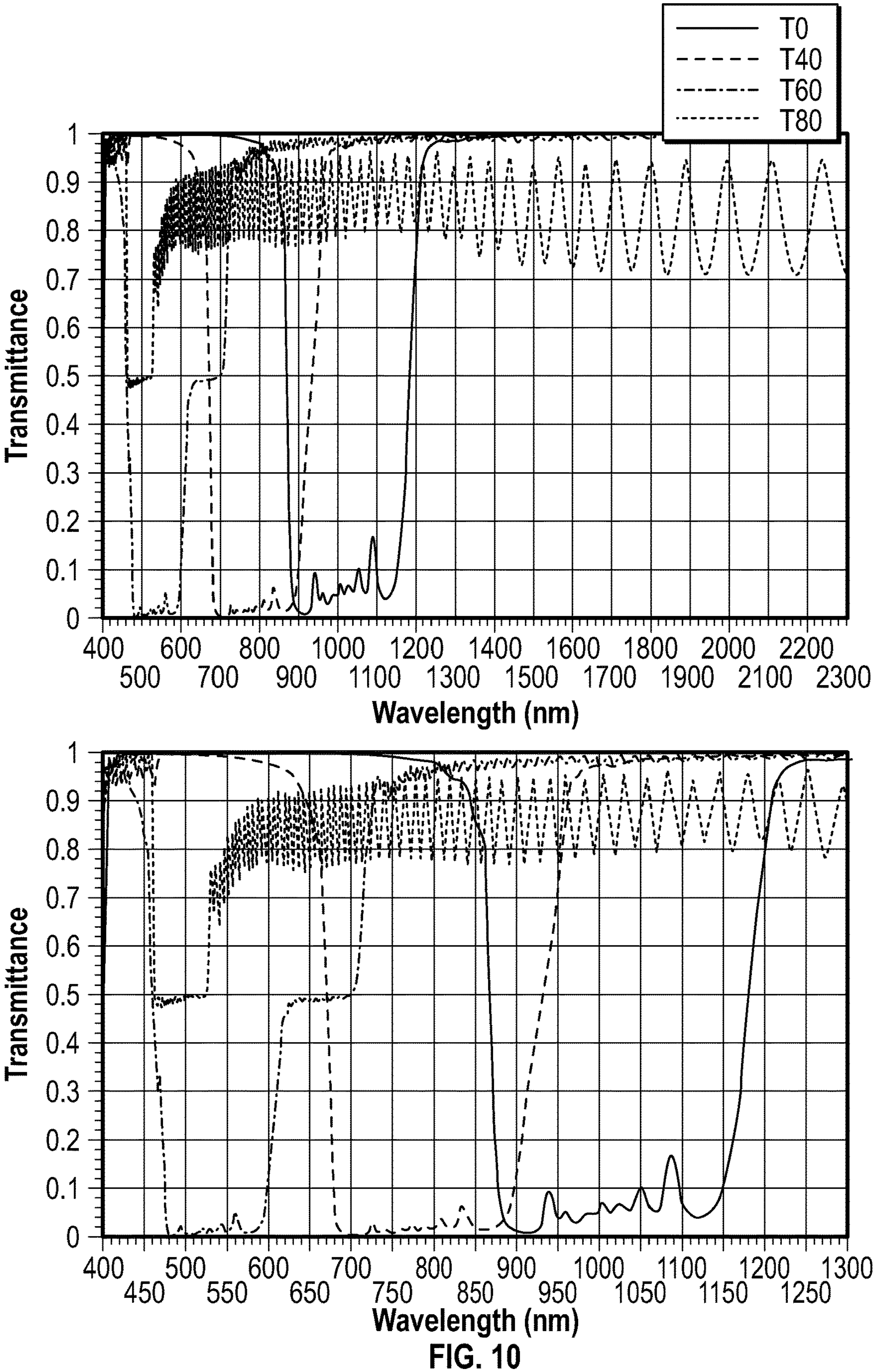
Figure 11:
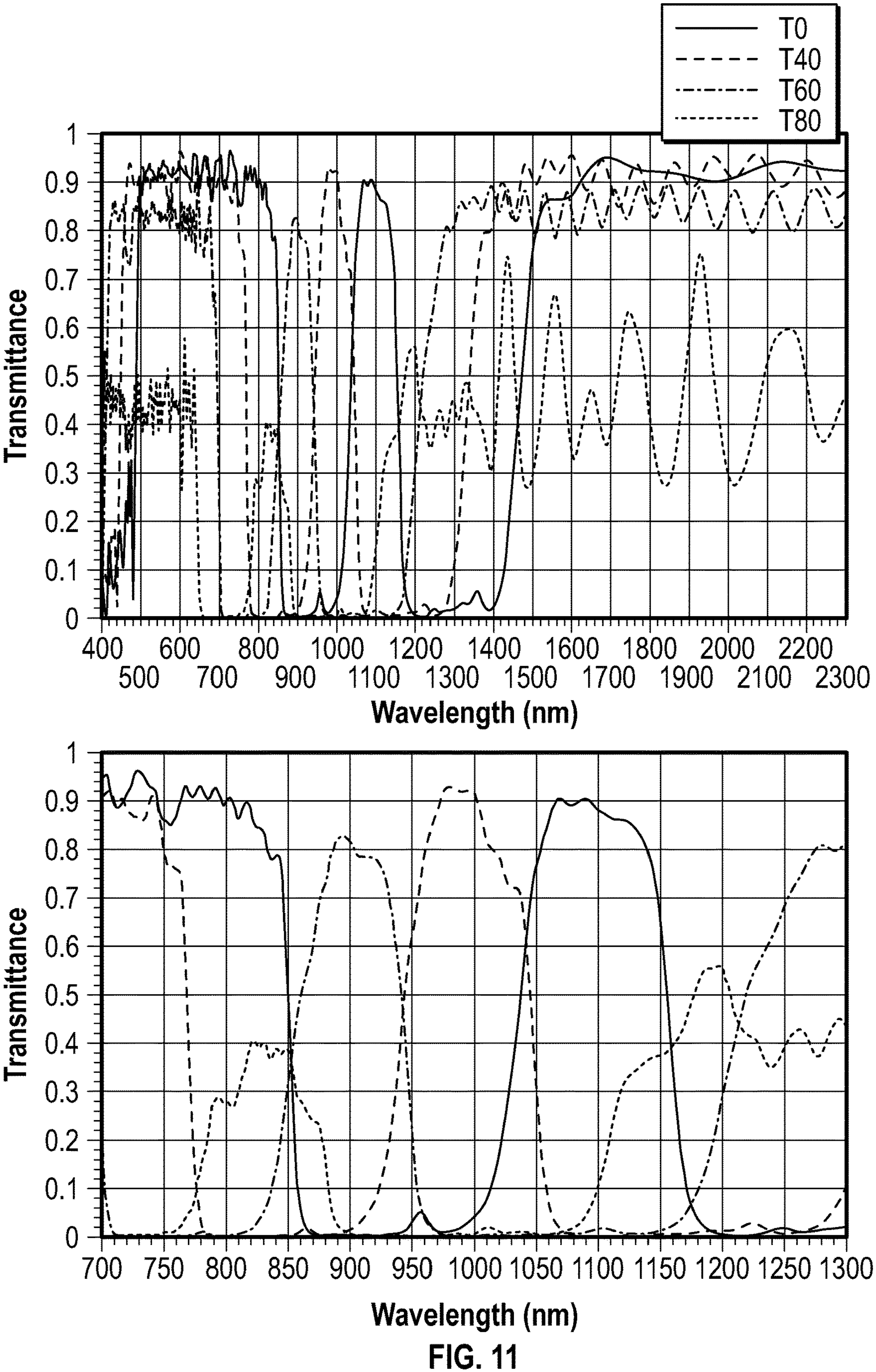
Figure 12:
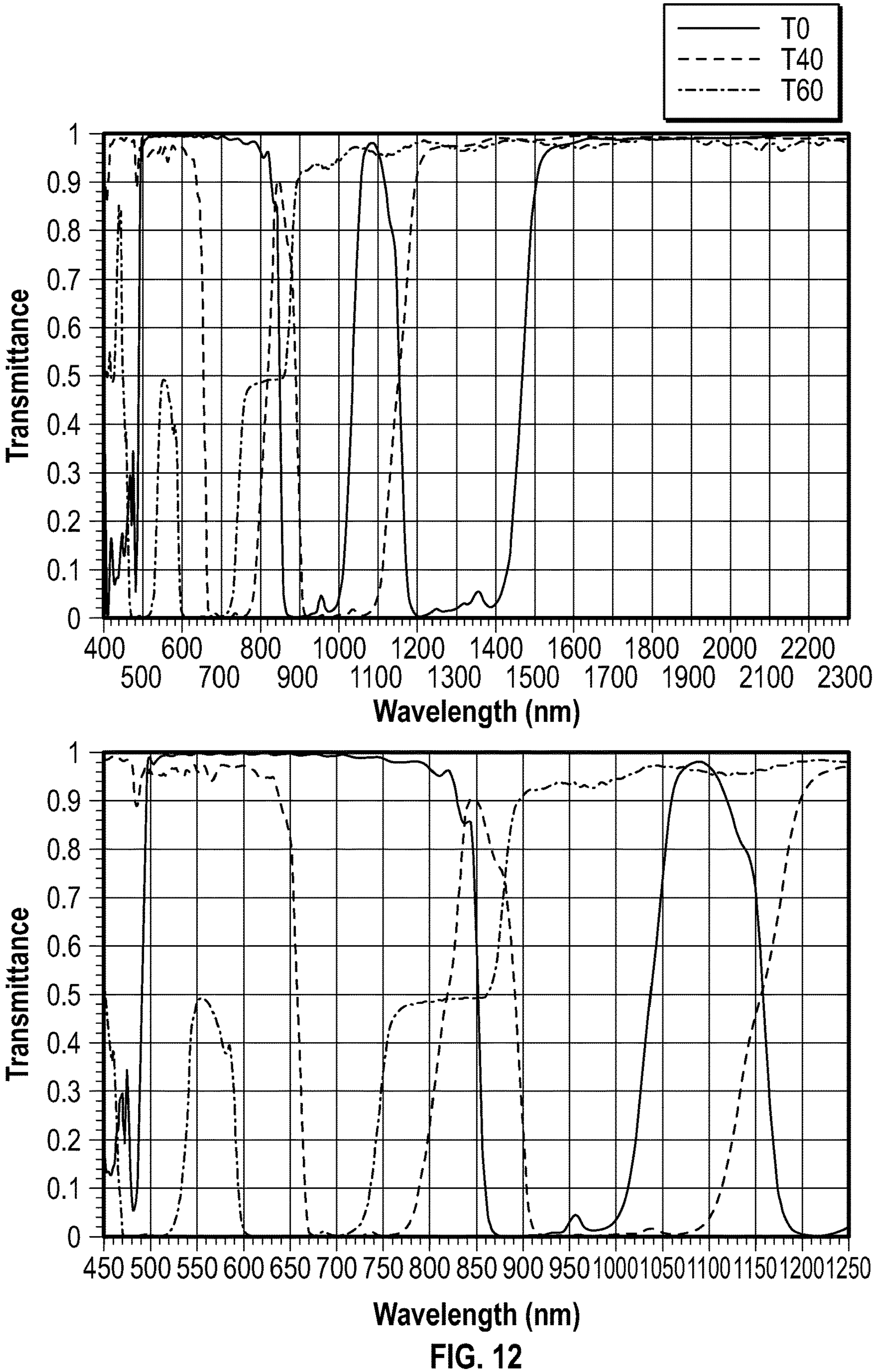
Figure 13:
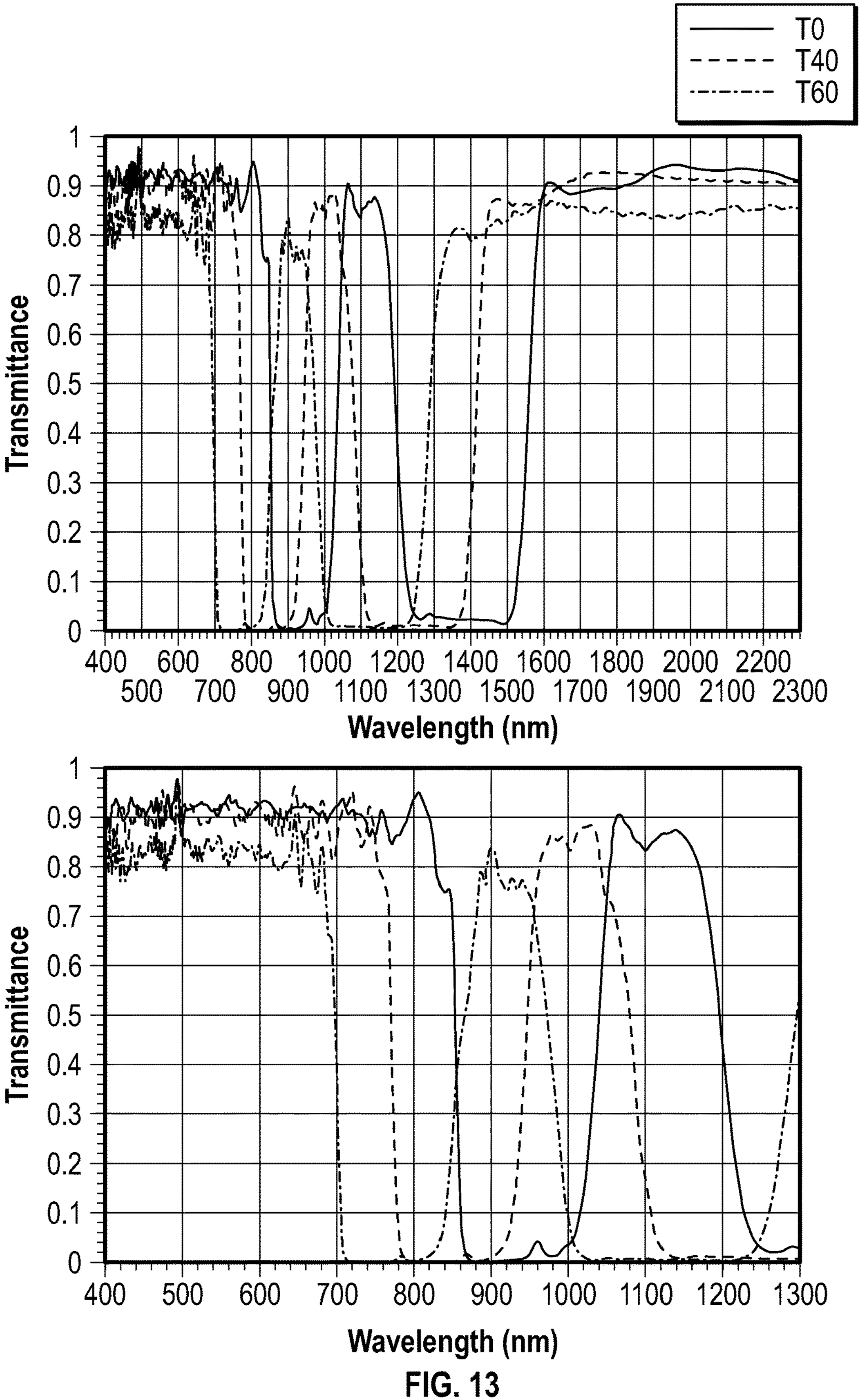
Figure 14:
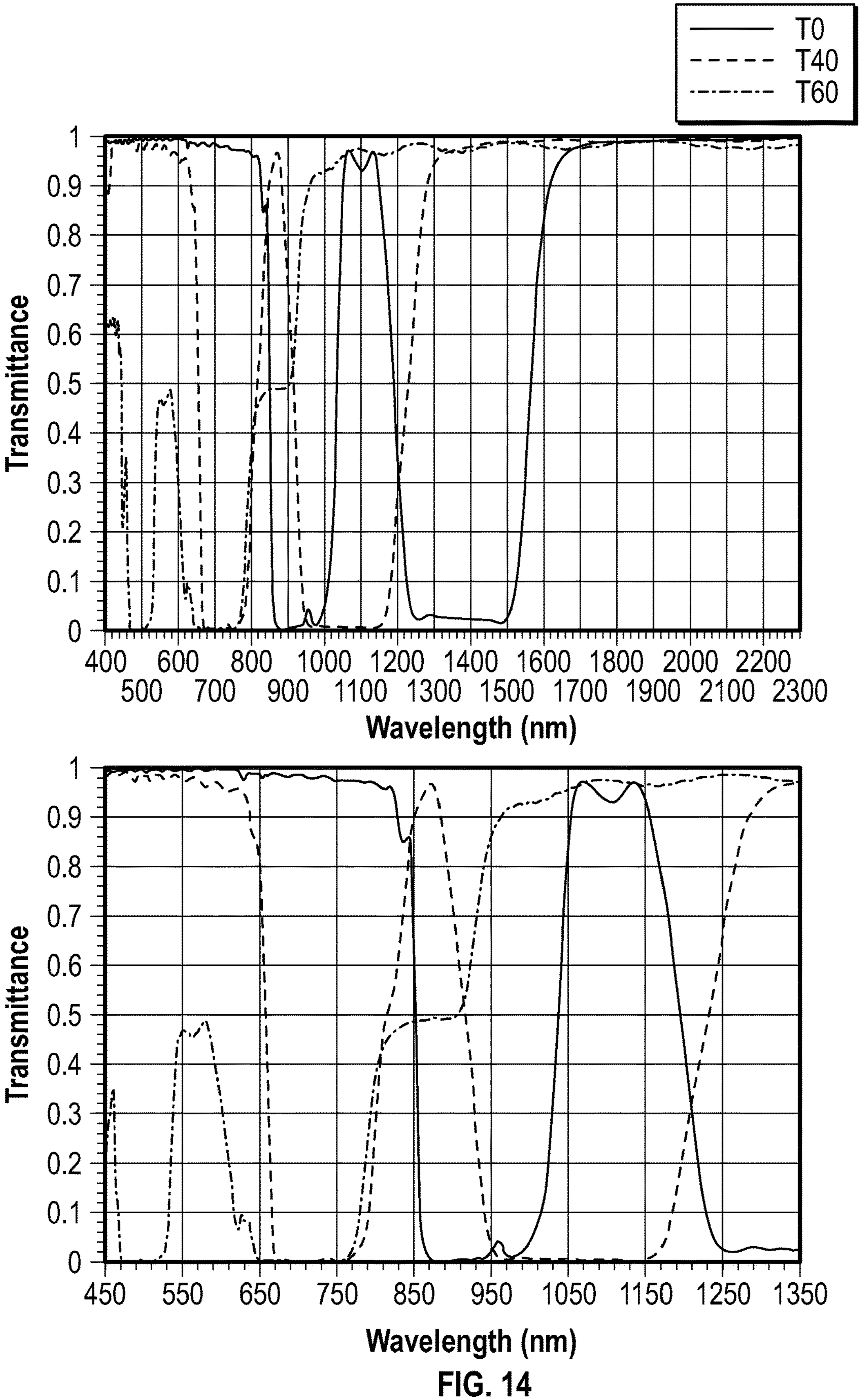
Figure 15:
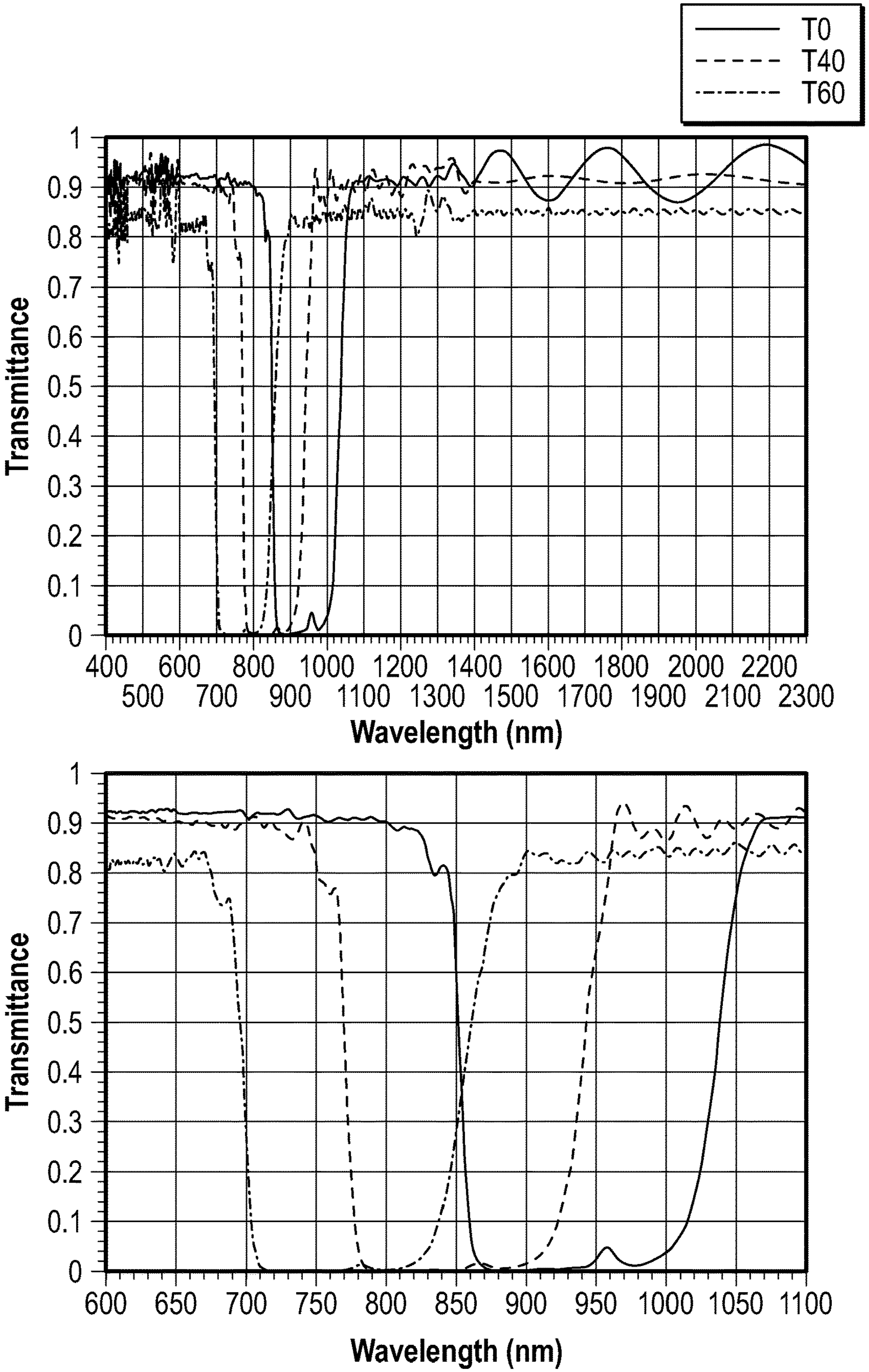
Figure 16:
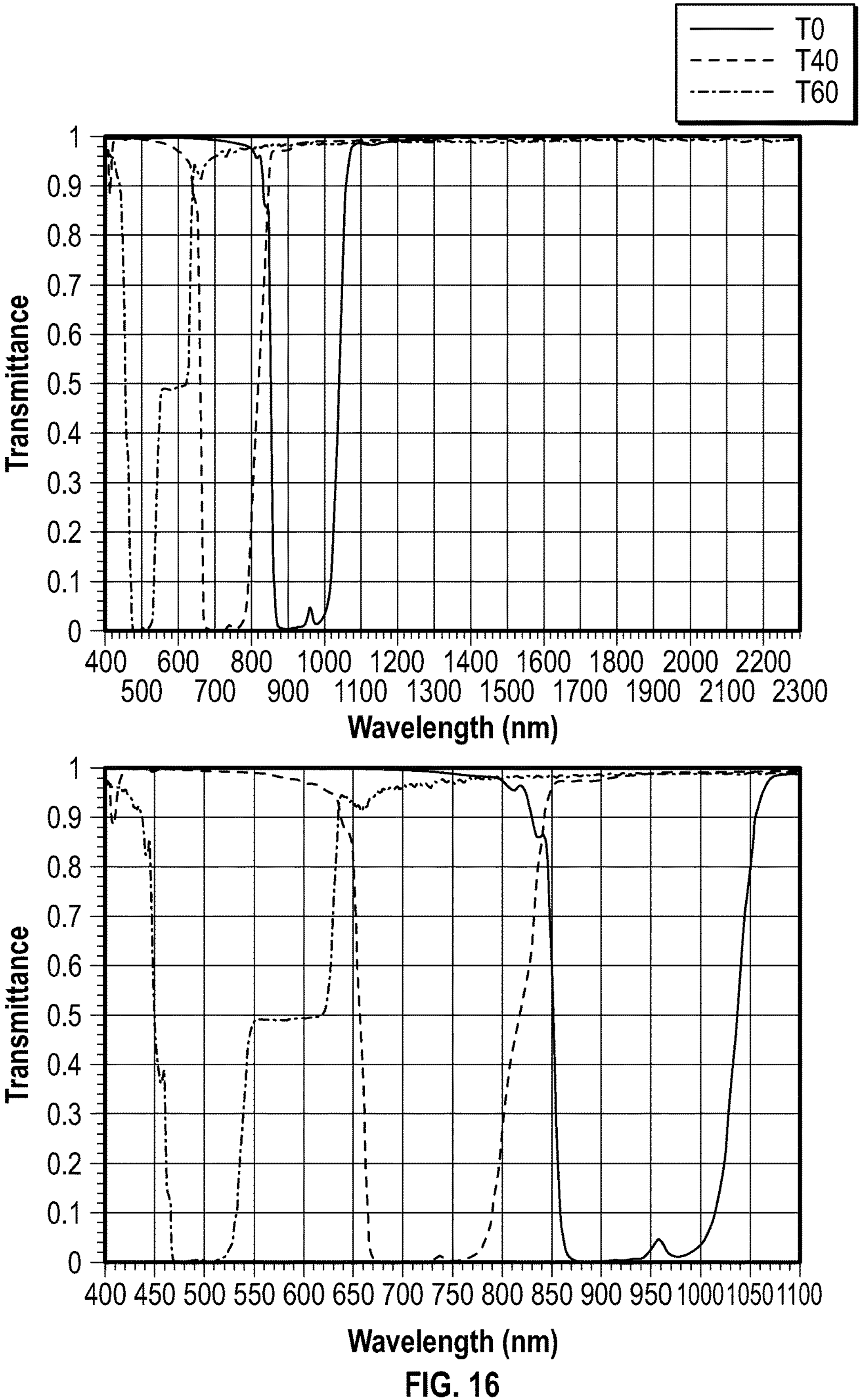
Figure 17:
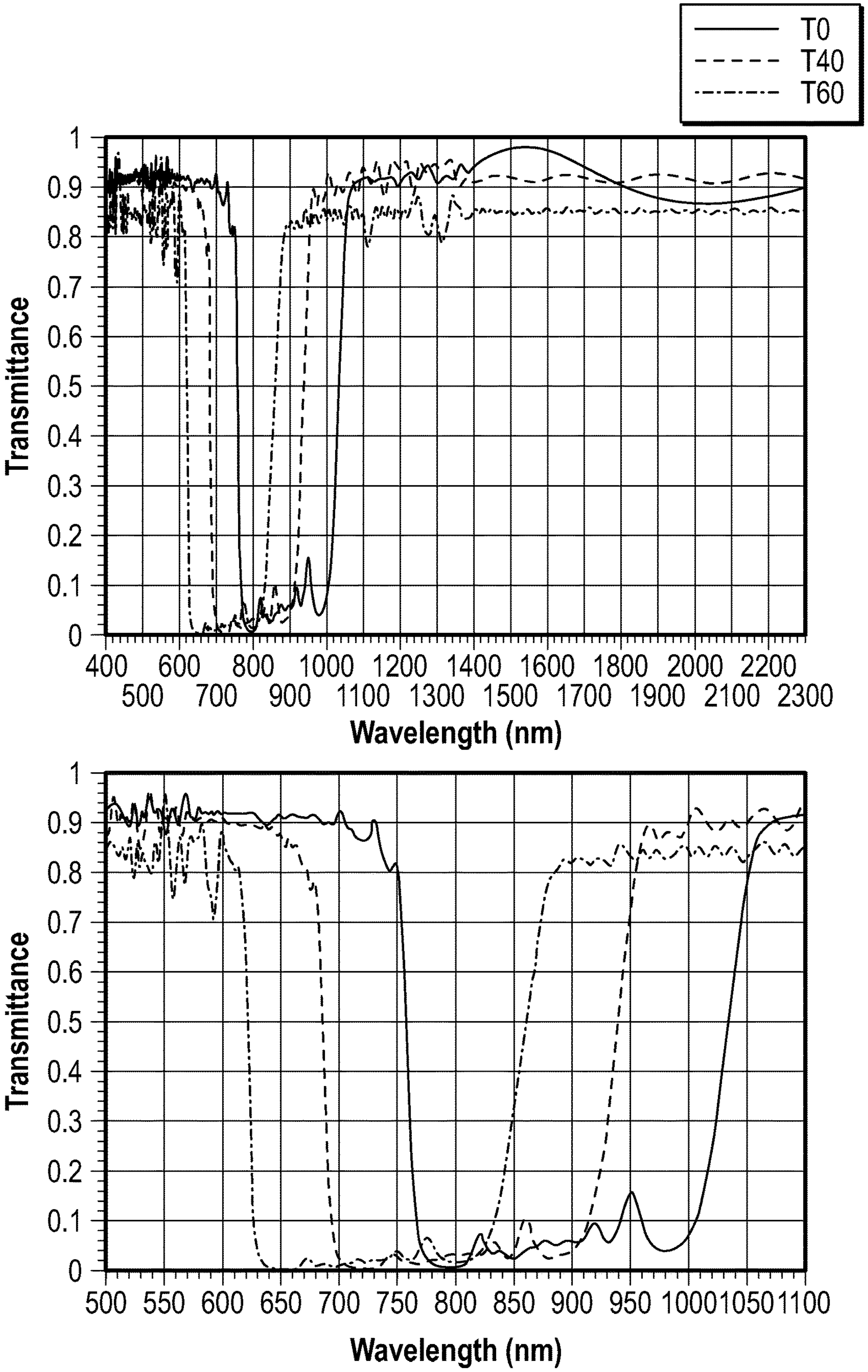
Figure 18:
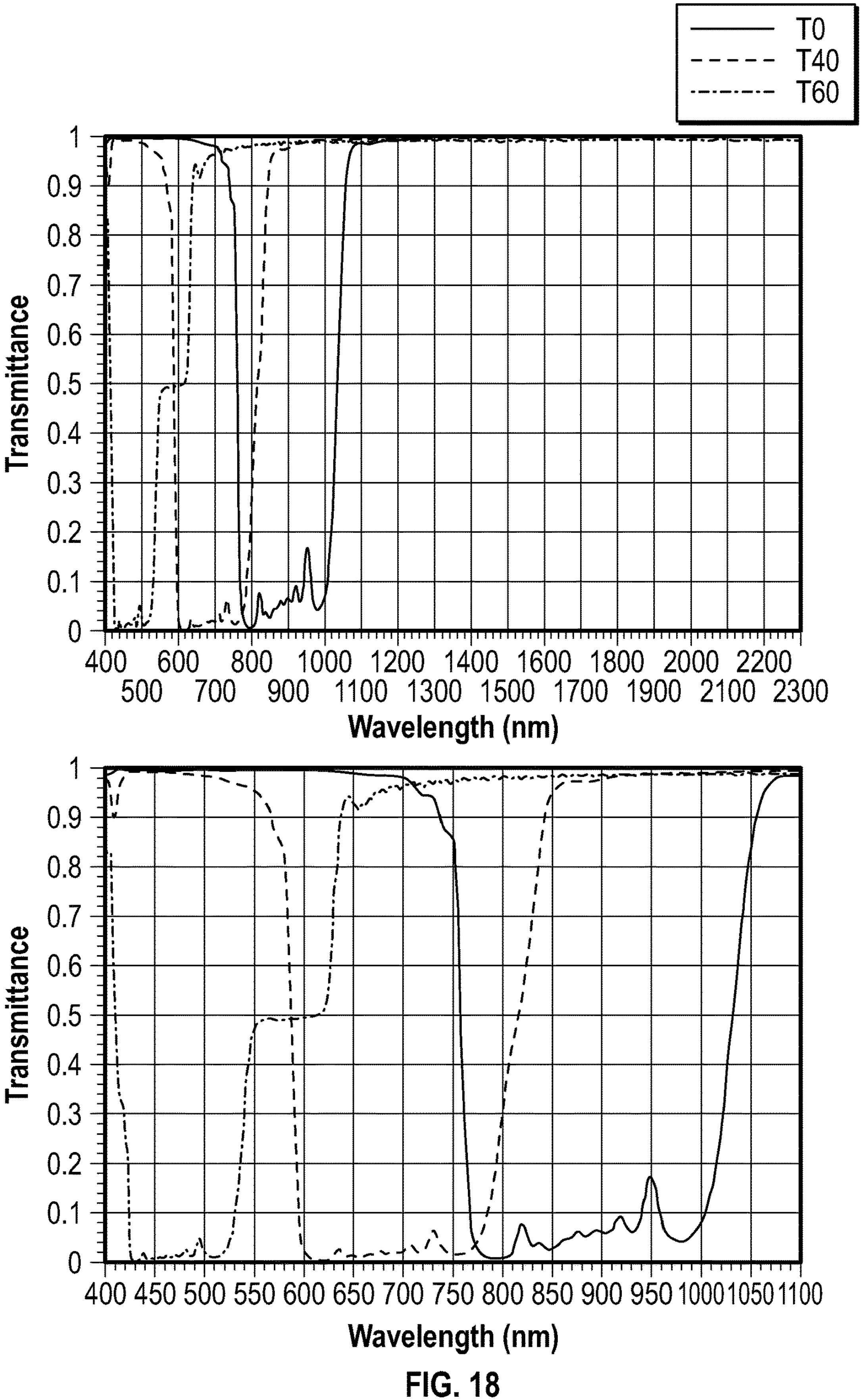

FIGS. 9-18 show the transmission spectra of different examples of optical film designs according to the disclosure. For instance, FIGS. 9 and 10 show the transmission spectra of 3M's Ultra-clear Solar film (UCSF) at different incident angles (β) of 0 degrees, 40 degrees, 60 degrees and 80 degrees. FIGS. 11-14 show the transmission spectra of an optical film with notch filters at different incident angles (β) of 0 degrees, 40 degrees, 60 degrees and 80 degrees. FIGS. 15-16 show the transmission spectra of an optical film with narrow bandpass filters at different incident angles (β) of 0 degrees, 40 degrees, and 60 degrees. FIGS. 17-18 show the transmission spectra of an optical film with blue shifted design of bandpass filters at different incident angles (β) of 0 degrees, 40 degrees, and 60 degrees.

Figure 19:
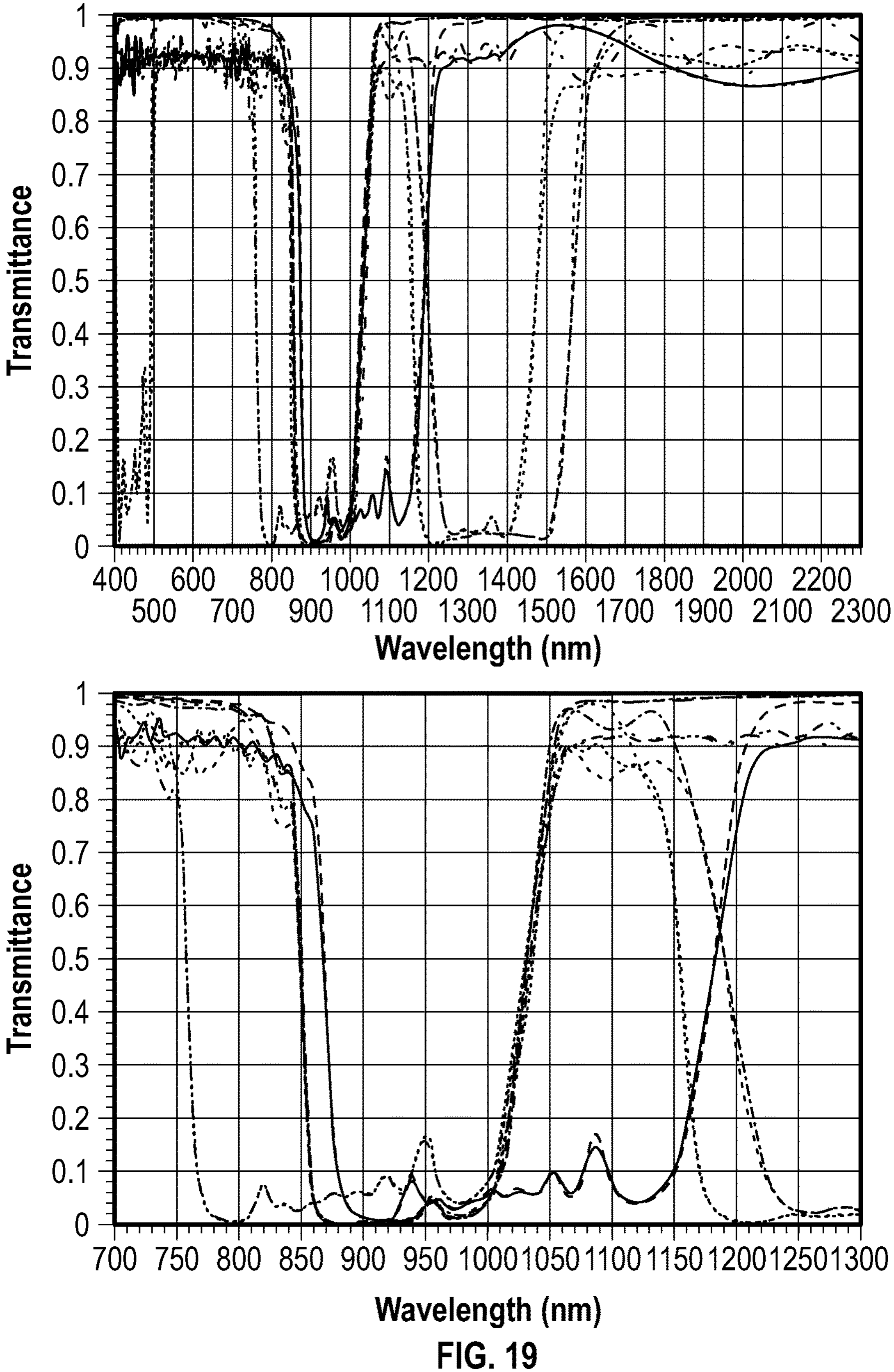
Figure 20:
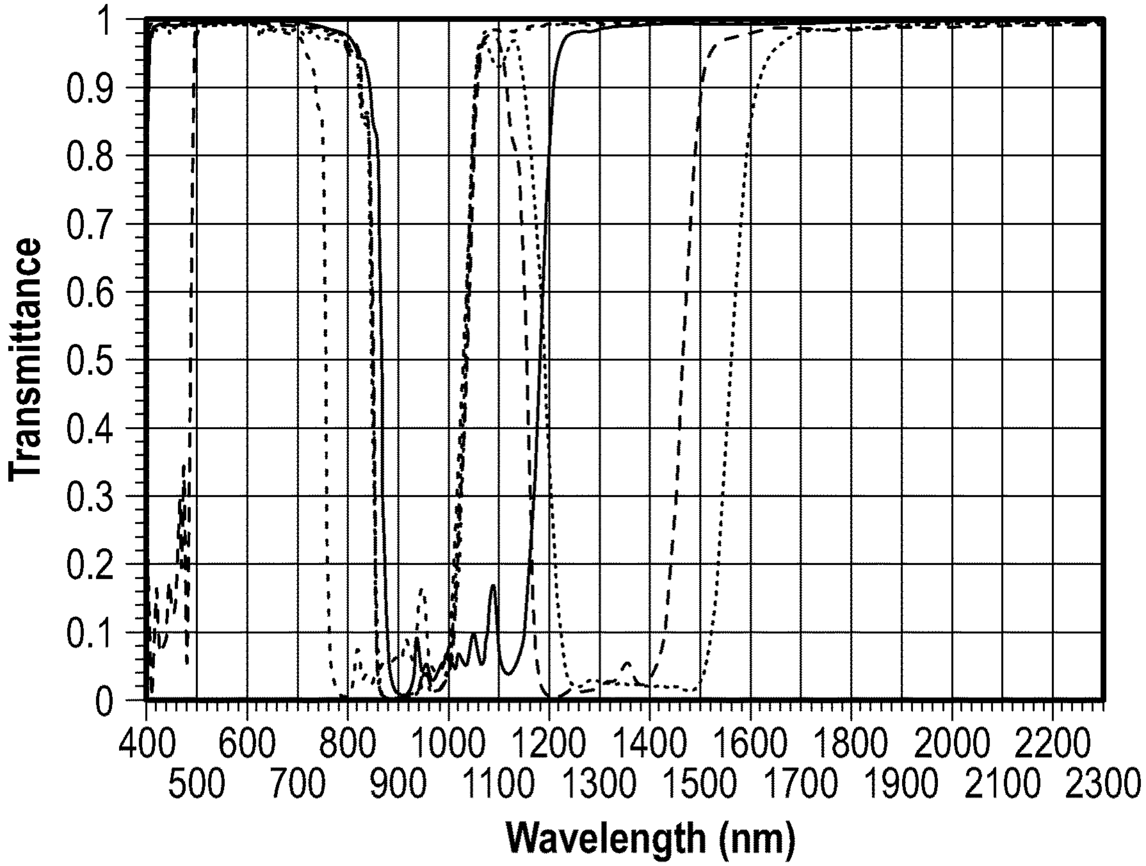
Figure 20:
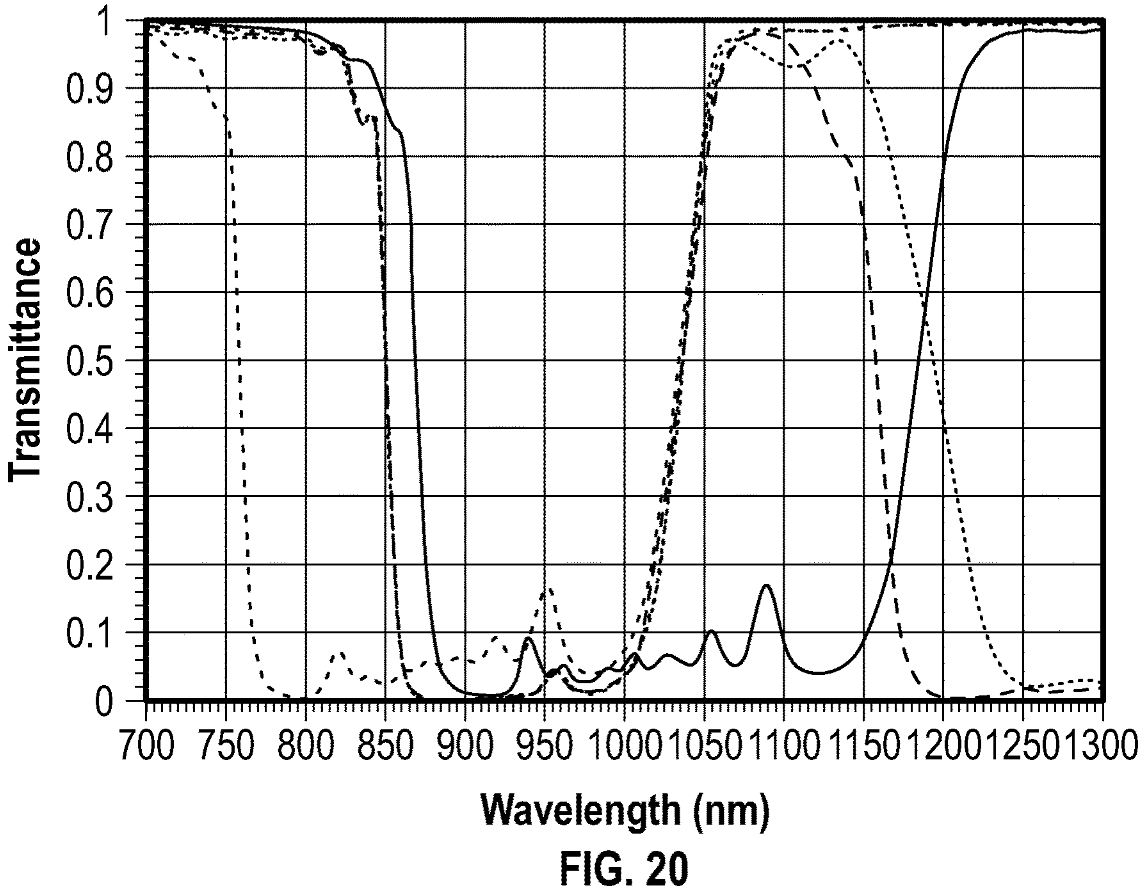
Figure 21:
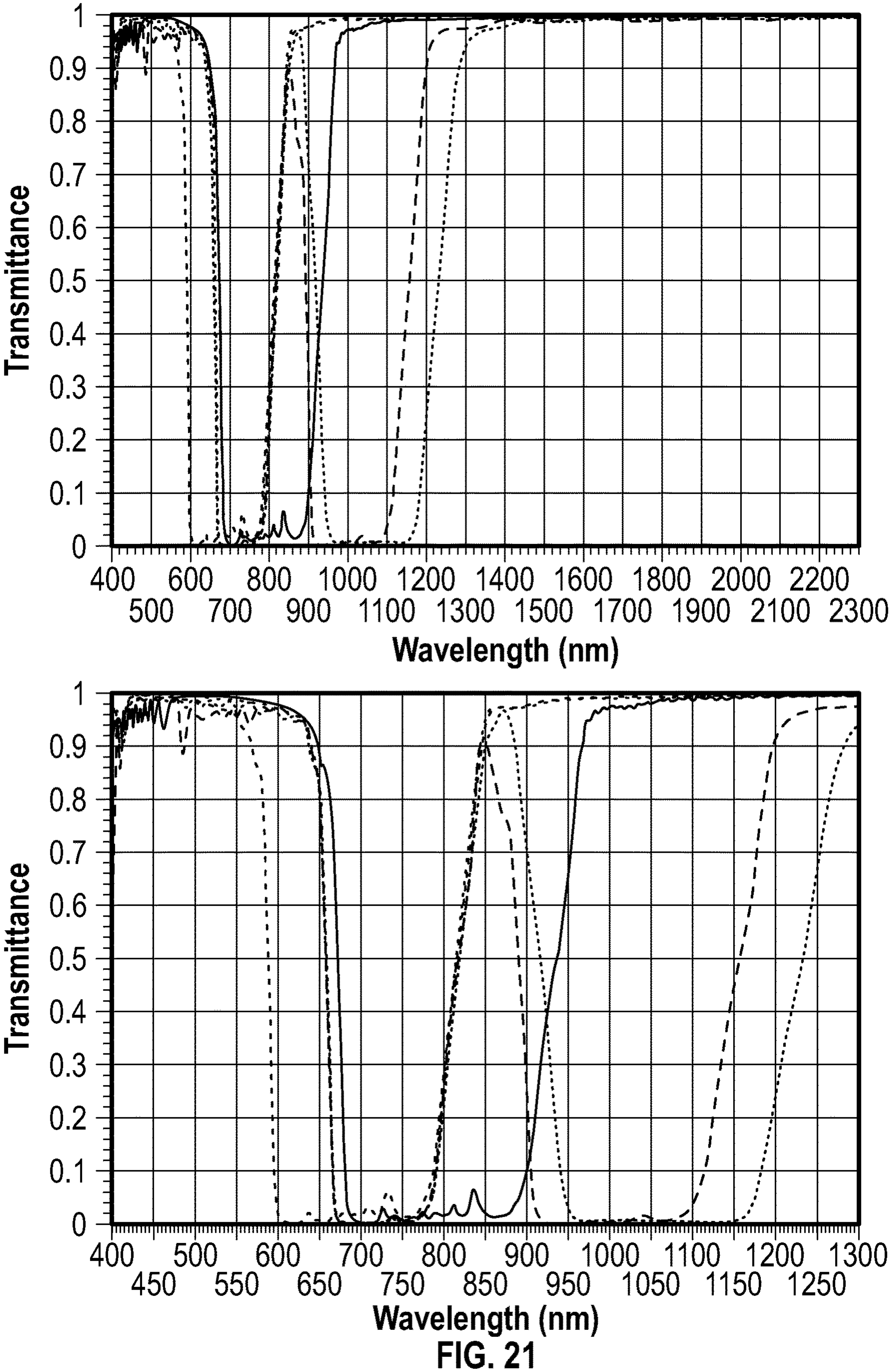
Figure 22:
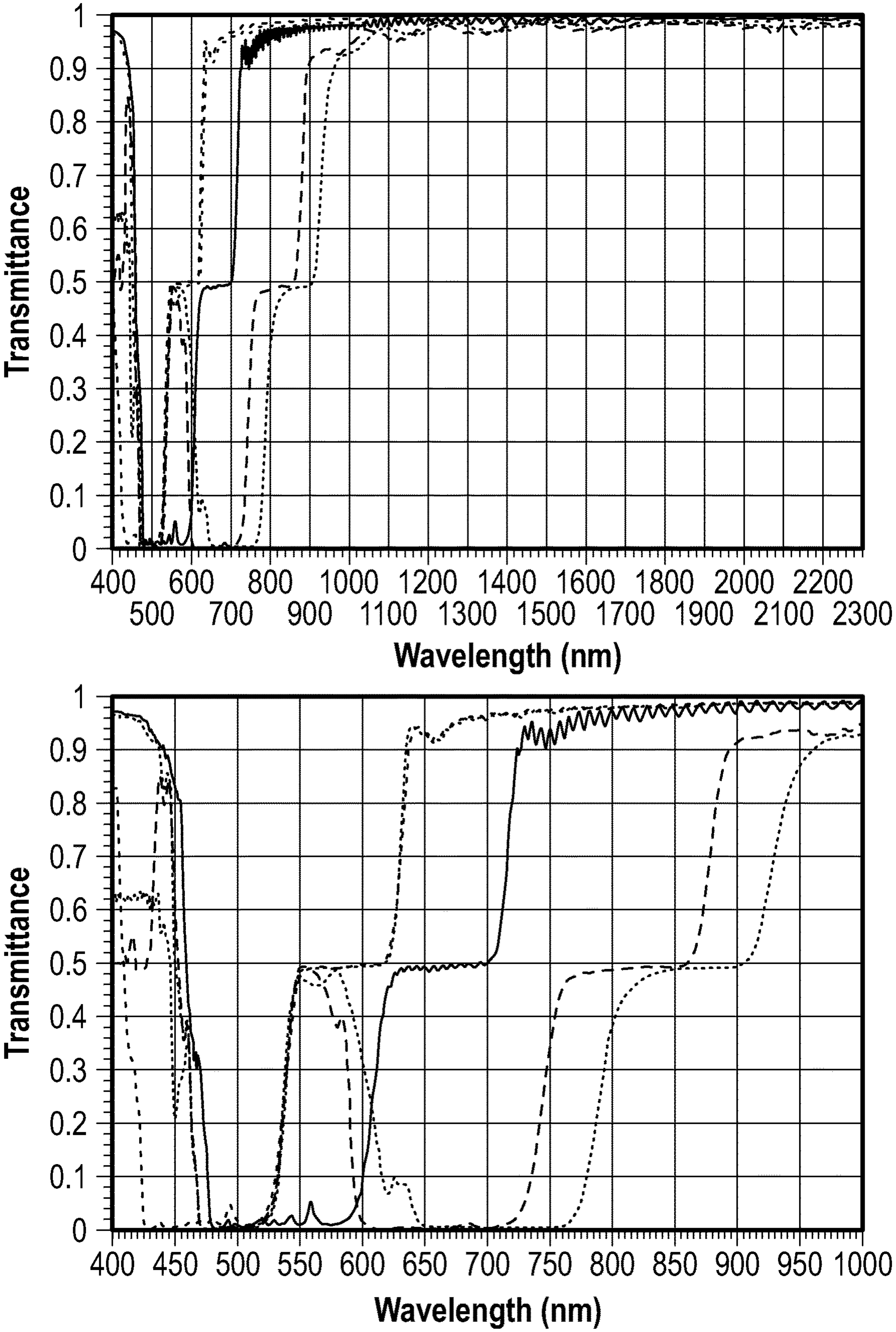

FIGS. 19 and 20 show the transmission spectra comparison of different designs of the optical film at an incident angle of 0 degrees. FIG. 21 shows the transmission spectra comparison of different designs of the optical film at an incident angle of 40 degrees. FIG. 22 shows the transmission spectra comparison of different designs of the optical film at an incident angle of 60 degrees.

The invention claimed is:

1. An optical sensing system comprising:

an optical film comprising a plurality of polymeric layers numbering at least 20 in total, each of the polymeric layers having an average thickness of less than about 500 nm; and a transceiver comprising at least one of a transmitter and a receiver and configured to at least one of emit and receive a first light toward an object through the optical film along a propagation direction making a first angle in an air with a normal to the optical film, the first angle greater than about 20 degrees, the first light having a first infrared wavelength in an infrared wavelength range extending from about 800 nm to about 2000 nm, such that for an incident light incident on the optical film in the air and having the first infrared wavelength and for at least one of mutually orthogonal first and second polarization states, the plurality of polymeric layers reflects at least 60% of the incident light at an incident angle of less than about 5 degrees, and transmits at least 40% of the incident light at an incident angle substantially equal to the first angle.

2. The optical sensing system of claim 1, wherein the transmitter comprises a laser light source, and wherein the receiver comprises an optical detector.

3. The optical sensing system of claim 1, wherein for the incident light incident on the optical film in the air, the plurality of the polymeric layers comprises a transmission pass band comprising a left band edge at a short wavelength side of the transmission pass band where the transmission of the optical film generally increases with increasing wavelength, and a right band edge at a long wavelength side of the transmission pass band where the transmission of the optical film generally decreases with increasing wavelength, the transmission pass band comprising a full width at half maximum (FWHM), such that the first infrared wavelength is outside the FWHM when the incident angle is less than about 5 degrees and within the FWHM when the incident angle is substantially equal to the first angle.

4. The optical sensing system of claim 1, wherein for the incident light incident on the optical film in the air, the plurality of the polymeric layers comprises a transmission stop band comprising a left band edge at a short wavelength side of the transmission stop band where the transmission of the optical film generally decreases with increasing wavelength, and a right band edge at a long wavelength side of the transmission stop band where the transmission of the optical film generally increases with increasing wavelength, the transmission stop band comprising a full width at half maximum (FWHM), such that the first infrared wavelength is within the FWHM when the incident angle is less than about 5 degrees and outside the FWHM when the incident angle is substantially equal to the first angle.

5. A vehicle comprising:

a window; and the optical sensing system of claim 1, wherein the window comprises the optical film embedded therein and the transceiver is disposed in an interior cabin of the vehicle so that the optical film is disposed between the transceiver and an exterior surface of the window.

6. An optically transparent window configured to be the window of a vehicle comprising an optical film disposed between, and bonded to, first and second substrate layers, the optical film comprising a plurality of alternating different polymeric first and second layers numbering at least 20 in total, each of the first and second layers having an average thickness of less than about 500 nm, the first and second layers have respective indices of refraction nx1 and nx2 along a same in-plane first direction, ny1 and ny2 along an in-plane second direction orthogonal to the first direction, and nz1 and nz2 along a third direction orthogonal to the first and second directions, such that for a first infrared wavelength between about 800 nm and about 2000 nm, nx1−nx2>0.1, ny1−ny2>0.1, and nz1 and nz2 are within about 20% of each other, such that for an incident light incident on the optical film in an air and having the first infrared wavelength and for each of mutually orthogonal first and second polarization states, the window reflects at least 60% of the incident light at an incident angle of less than about 5 degrees, and transmits at least 40% of the incident light at an incident angle of greater than about 30 degrees.

7. The optically transparent window of claim 6, wherein the optical film is bonded to the first and second substrate layers via respective first and second bonding layers, and wherein at least a region of each of the first and second bonding layers has an average optical transmittance of greater than about 50% in a wavelength range extending from about 700 nm to about 1600 nm.

8. A flexible optical construction configured to be incorporated in a window, the flexible optical construction comprising an optical film bonded to, and substantially coextensive in length and width with, a first bonding layer configured to bond to a first substrate of the window, the optical film comprising a plurality of alternating different polymeric first and second layers numbering at least 20 in total, each of the first and second layers having an average thickness of less than about 500 nm, the first and second layers have respective indices of refraction nx1 and nx2 along a same in-plane first direction, ny1 and ny2 along an in-plane second direction orthogonal to the first direction, and nz1 and nz2 along a third direction orthogonal to the first and second directions, such that for a first infrared wavelength between about 800 nm and about 2000 nm, nx1−nx2>0.1, and nz1 and nz2 are within about 20% of each other, such that for an incident light incident in an air and having the first infrared wavelength and for each of mutually orthogonal first and second polarization states:

for the first infrared wavelength, the optical film reflects at least 60% of the incident light at a first incident angle of less than about 5 degrees, and transmits at least 40% of the incident light at a second incident angle of greater than about 30 degrees, and the first bonding layer has an optical transmittance of greater than about 80% for each of the first and second incident angles; and for a visible wavelength range between about 420 nm and about 680 nm, each of the optical film and the first bonding layer has an average optical transmittance of greater than about 70%, such that the flexible optical construction is configured to bend at a radius of less than about 10 cm with no or little damage to the flexible optical construction.

9. The flexible optical construction of claim 8, wherein the first substrate comprises glass.

10. The flexible optical construction of claim 8, wherein the optical film is further bonded to, and substantially coextensive in length and width with, a second bonding layer, opposite the first bonding layer, configured to bond to a second substrate of the window.

* * * * *